(12) United States Patent
Ueki et al.

(10) Patent No.: US 7,438,406 B2
(45) Date of Patent: Oct. 21, 2008

(54) INKJET PRINTING METHOD AND IMAGE FORMING APPARATUS

(75) Inventors: Hiroyuki Ueki, Ebina (JP); Ken Hashimoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 407 days.

(21) Appl. No.: 11/057,314

(22) Filed: Feb. 11, 2005

(65) Prior Publication Data

US 2006/0061641 A1 Mar. 23, 2006

(30) Foreign Application Priority Data

Sep. 17, 2004 (JP) ............................. 2004-270903

(51) Int. Cl.
*C09D 11/00* (2006.01)
(52) U.S. Cl. .................. 347/100; 106/31.13; 106/31.41
(58) Field of Classification Search ................. 347/100; 106/31.13, 31.41
See application file for complete search history.

(56) References Cited

U.S. PATENT DOCUMENTS

| | | | | |
|---|---|---|---|---|
| 4,954,395 | A * | 9/1990 | Hasegawa et al. | 428/32.24 |
| 5,733,702 | A * | 3/1998 | Okado et al. | 430/119.86 |
| 6,409,330 | B1 * | 6/2002 | Nakamura et al. | 347/103 |
| 6,950,615 | B2 * | 9/2005 | Jung et al. | 399/67 |
| 2001/0004425 | A1 * | 6/2001 | Shinohara et al. | 399/301 |
| 2002/0136868 | A1 * | 9/2002 | Moriya et al. | 428/195 |
| 2003/0054145 | A1 * | 3/2003 | Tokunaga et al. | 428/195 |
| 2003/0118811 | A1 * | 6/2003 | Sato et al. | 428/327 |
| 2003/0234846 | A1 * | 12/2003 | Koga et al. | 347/100 |
| 2004/0006158 | A1 * | 1/2004 | Horie et al. | 523/160 |
| 2004/0092621 | A1 * | 5/2004 | Kataoka et al. | 523/160 |
| 2005/0043434 | A1 * | 2/2005 | Ichinose et al. | 523/160 |

FOREIGN PATENT DOCUMENTS

| | | | |
|---|---|---|---|
| JP | 5-96720 | | 4/1993 |
| JP | 05096720 | A * | 4/1993 |
| JP | 11-188855 | | 7/1999 |
| JP | 2002-178624 | | 6/2002 |
| JP | 2002178624 | A * | 6/2002 |

* cited by examiner

*Primary Examiner*—Manish S. Shah
*Assistant Examiner*—Laura E Martin
(74) *Attorney, Agent, or Firm*—Fildes & Outland, P.C.

(57) ABSTRACT

The present invention relates to an inkjet printing method including forming an image by ejecting an ink comprising at least a colorant and a solvent to a surface of a recording body, and dispersing a resin powder to the surface of the recording body, wherein the resin powder has a particle size of approximately not less than 0.1 μm to not more than 10 μm and a weight average molecular weight of approximately not less than 8,000 to not more than 300,000 and has a monomer that includes a polar group having a salt structure, and to an image forming apparatus using the method.

20 Claims, 9 Drawing Sheets

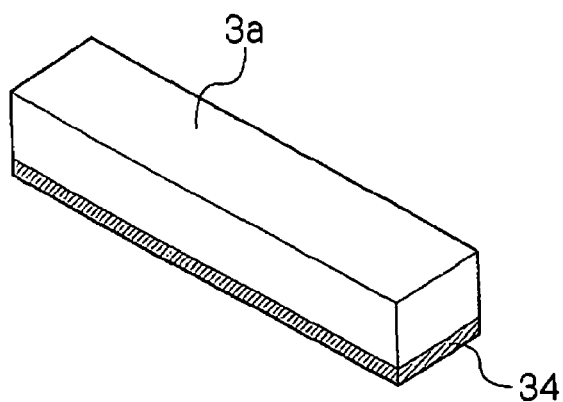
FIG.3A
FIG.3B
FIG.4
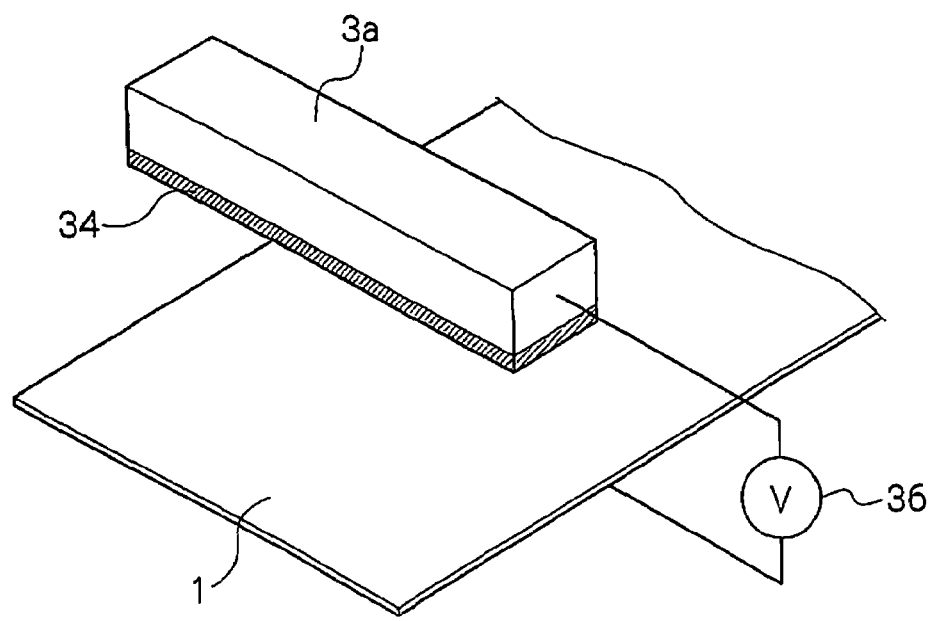

FIG.5
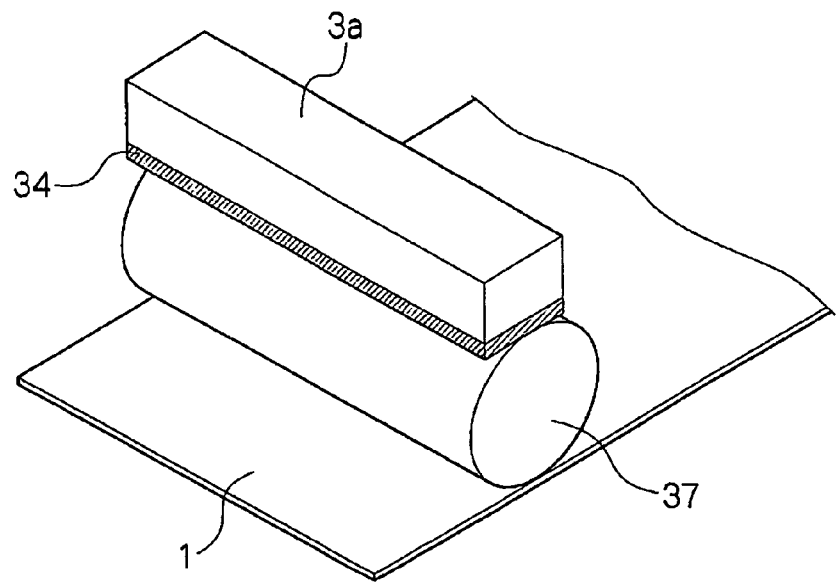
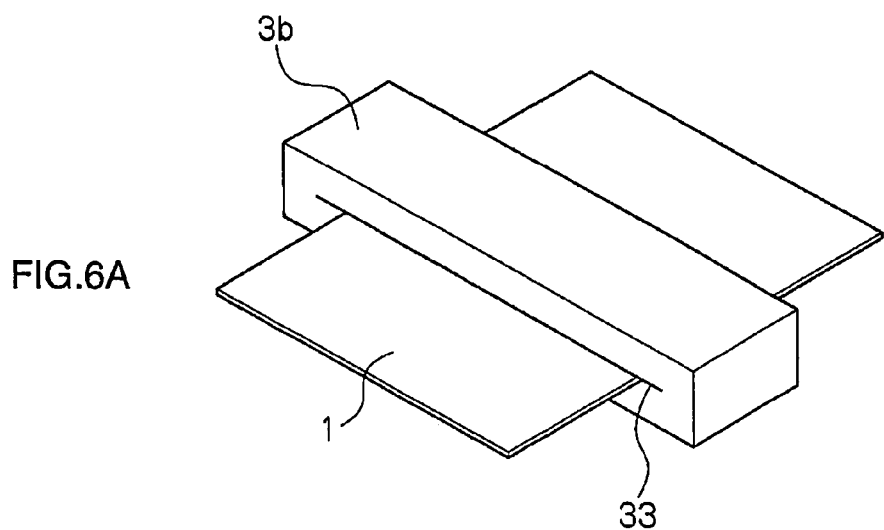
FIG.6A
FIG.6B
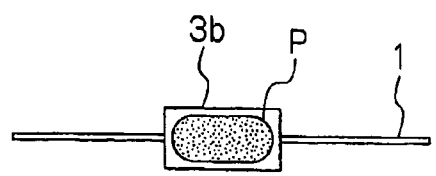

INKJET PRINTING METHOD AND IMAGE FORMING APPARATUS

CROSS-REFERENCE TO RELATED APPLICATIONS

This application claims priority under 35USC 119 from Japanese Patent Application No. 2004-270903, the disclosure of which is incorporated herein by reference.

BACKGROUND OF THE INVENTION

1. Field of the Invention

The present invention relates to a method for inkjet printing method and an image forming apparatus.

2. Description of the Related Art

Printers using an inkjet printing method eject a liquid or melt-solid ink from a nozzle, a slit or a porous film to record on paper, fabric or film, and are known to have advantages such as small size, inexpensiveness and quietness. Furthermore, a piezo inkjet printing method using a piezoelectric element, and a heat inkjet printing method in which recording is carried out by applying heat energy to an ink have been developed aiming at increasing printing velocity and improving resolution of an image.

Although the piezo inkjet printing method and heat inkjet printing method have advantages such as high printing velocity and improved image resolution, they are sometimes disadvantageous in that printing properties deteriorate when plain paper is used as a recording medium, and that feathering when printing in a single color, inter-color bleeding, which is a disadvantage in color printing using multiple colors, curling, where paper curls to the surface on which an image has been printed, or cockling, whereby the paper is deformed to become wavy, may occur depending on the kind of paper. Accordingly, it is difficult to obtain excellent image quality irrespective of the kind of recording medium.

Japanese Patent Application Laid-Open (JP-A) No. 11-188855 suggests an image forming apparatus aiming at improving image quality, specifically in the case where gloss paper is used as a recording medium, by providing powder having a porous structure to an image portion after formation of an image using a recording liquid to prevent the image from contacting other articles.

Although the image forming apparatus using the above-mentioned system can prevent deterioration of image quality due to contact of other articles, such as other recording medium, with the image printed on the recording medium, the apparatus is not formed from the viewpoint of prevention of disadvantages such as the above-mentioned feathering, inter-color bleeding, curling and cockling that may occur on the printed image formed on the recording medium. Accordingly, the apparatus can not essentially or sufficiently improve these disadvantages.

Specifically, when plain paper is used as a recording medium, the above-mentioned image forming apparatus cannot be sufficiently prevented disadvantageous such as feathering, inter-color bleeding, curling and cockling, and therefore excellent image quality can not be obtained by using the apparatus.

In view of this, JP-A No. 2002-178624 suggests a method comprising dispersing a predetermined amount of powder that can separate a colorant and a solvent in an ink to the surface of the recording medium before ejection of the ink, or dispersing a predetermined amount of the powder immediately after dropping of the ink to the surface of the recording medium. In this publication, the "powder that can separate a colorant and a solvent in an ink" units powder that can absorb the solvent in the ink or powder that coagulates the colorant in the ink.

Where the powder that can absorb the solvent in the ink is used, the powder absorbs the solvent in the ink, whereby spreading of the ink dropped on the recording medium in the direction of the surface of the recording medium can be prevented. Where the powder that coagulates the colorant in the ink is used, the colorant coagulates upon contact of the ink with the powder on the recording medium, whereby the components in the solvent other than the ink are absorbed to permeate into the recording medium, whereas the colorant is separated from the solvent components, and remains and coagulates on the surface of the recording medium without being absorbed by the recording medium. Accordingly, feathering, inter-color bleeding, curling and cockling can be prevented by using such powders.

However, the above-mentioned method is disadvantageous in that it is difficult to fix the ink since the ink is provided on the powder, which impairs image fastness. In addition, there also exists a disadvantage that the image concentration easily becomes uneven due to poor fixing of the ink.

SUMMARY OF THE INVENTION

The present invention has been made in view of the above circumstances and provides a first aspect of the present invention, which is an inkjet printing method comprising forming an image by ejecting an ink comprising at least a colorant and a solvent to a surface of a recording body, and dispersing a resin powder to the surface of the recording body, wherein the resin powder has a particle size of approximately not less than 0.1 μm to not more than 10 μm and a weight average molecular weight of approximately not less than 8,000 to not more than 300,000 and comprises a monomer comprising a polar group having a salt structure.

The second aspect of the present invention is an image forming apparatus comprising an image forming unit, which ejects an ink comprising a colorant and a solvent to a surface of a recording body to form an ink image on the surface of the recording body, and a powder supplying unit, which disperses a resin powder to the surface of the recording body, wherein the resin powder has a particle size of approximately not less than 0.1 μm to not more than 10 μm and a weight average molecular weight of approximately not less than 8,000 to not more than 300,000 and comprises a monomer comprising a polar group having the salt structure.

BRIEF DESCRIPTION OF THE DRAWINGS

Preferred embodiments of the present invention will be described in detail based on the following figures, wherein:

FIG. 3A is a perspective illustration that shows the another embodiment of the powder supplying unit 3 in the image forming apparatus of the present invention shown in FIG. 1, and FIG. 3B is an front elevational illustration of the mesh portion that disperses the resin powder in the powder supplying unit shown in FIG. 3A, FIG. 4 is a perspective illustration that shows the another embodiment of the powder supplying unit shown in FIG. 3, FIG. 5 is a perspective illustration that shows the still another embodiment of the powder supplying unit shown in FIG. 3, FIG. 6A is a perspective illustration that shows the still another embodiment of the powder supplying unit 3 in the image forming apparatus of the present invention shown in FIG. 1, and FIG. 6B is a sectional illustration of the powder supplying unit shown in FIG. 6A.

DETAILED DESCRIPTION OF THE INVENTION

Figure 1:
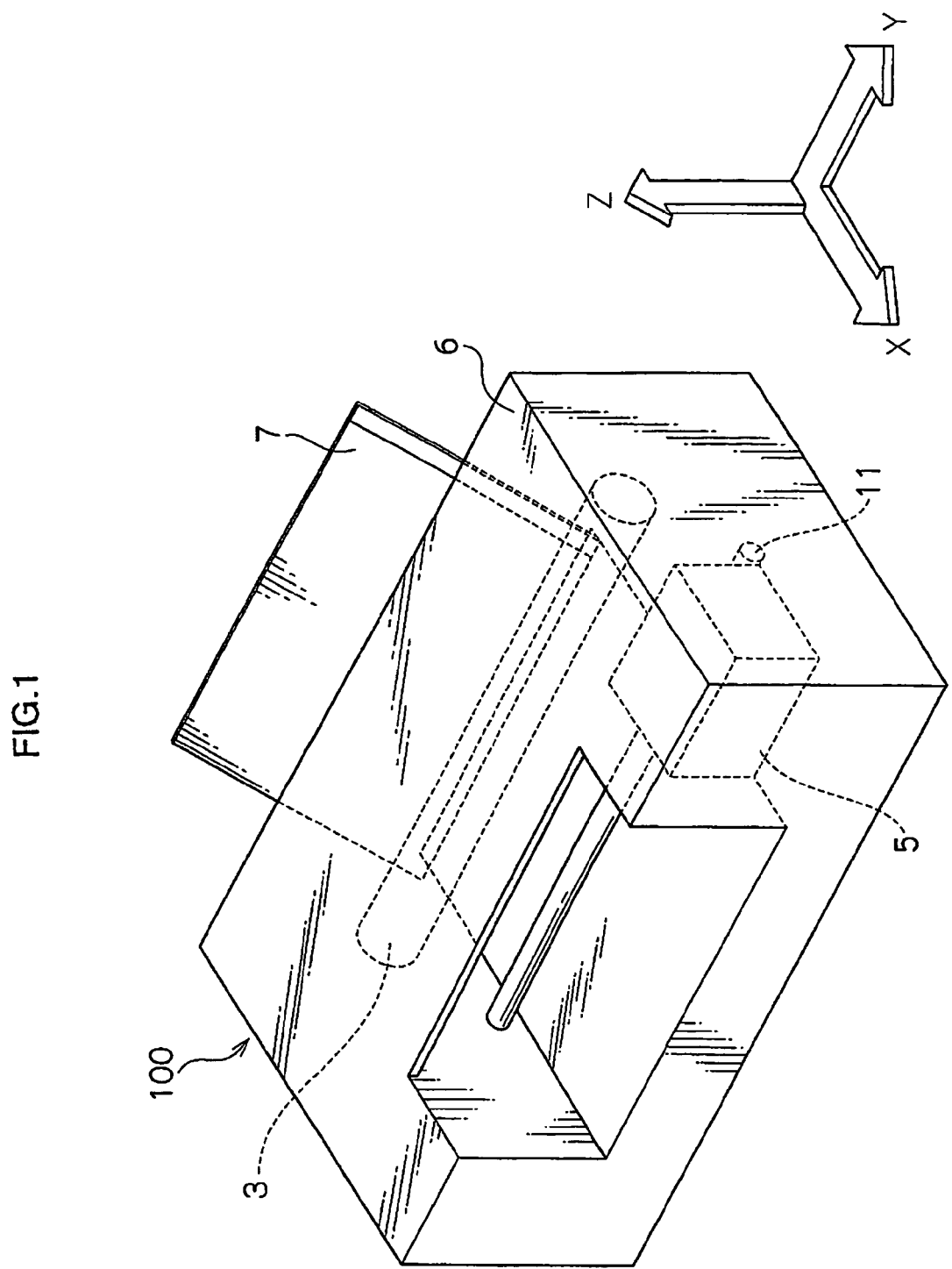
FIG. 1 is a perspective illustration that shows the outer constitution of the image forming apparatus of the present invention.

In the present invention, solubility of the water-absorbing powder in water is a quite important factor in order to provide function of fixing the ink to the powder that can absorb a solvent in the ink.

The water-absorbing powder disclosed in JP-A 2002-178624 inhibits fixing of ink since it exists on the recording medium in powdery form. On the other hand, in the present invention, a water-absorbing powder that absorbs a solvent in the ink and partially dissolves upon contacting with ink, wherein the dissolved portion of the powder adheres to a recording medium, is used.

In order to partially dissolve the powder in the solvent in the ink, it is important to preferably combine (1) adjustment of particle size, (2) adjustment of molecular weight, and (3) identification of structural unit.

Since the inkjet printing method of the present invention utilizes the property of the powder to absorb the solvent in the ink upon contacting with the ink, the drying property is favorable and feathering can be prevented effectively. In addition, since the powder partially dissolves, the powder is partially (or wholly) absorbed by and adhered to the recording medium, whereby the fixing property of the ink is favorable and image fastness can be improved.

Furthermore, since the image forming apparatus of the present invention has a construction that operates based on the above-mentioned inkjet printing method of the present invention, the fixing property of the ink can be improved and favorable image fastness can be provided while the absorbing property of the solvent in the ink is kept high to maintain speed of drying. Accordingly, printing images having superior image quality can be obtained using this image forming apparatus.

Firstly, the resin powder and the ink used for the inkjet printing method and the image forming apparatus of the present invention are explained. Secondly, the inkjet printing method is explained, and finally, the image forming apparatus is described in detail.

1. Resin Powder

The resin powder used for the present invention absorbs a solvent in an aqueous ink (water and/or an water-soluble organic solvent) while the powder partially dissolves in the solvent the present invention uses, as an example of the resin powder having such a property, a resin powder having at least a particle size of approximately not less than 0.1 µm to not more than 10 µm and a weight average molecular weight of approximately not less than 8,000 to not more than 300,000 and comprising a polar group having a salt structure.

The resin powder used for the present invention can absorb the solvent by amounts of several times to several hundreds times its own weight. In order to absorb the solvent in the ink, the resin powder used for the present invention is made of a cross-linked polymer having hydrophilic groups. The hydrophilic groups in the polymer dissolve in water, whereas the polymer has a cross-linked net structure, can hold water in the structure and does not dissolve in water. Water-absorbing resins used in conventional inkjet printing methods are wholly cross-linked resins, which swell by absorbing water but do not dissolve and thus the shape of particles is maintained. Therefore, such resins can not be fixed on a recording medium, which reduces the fixing property of the ink and the fastness of the image.

The resin powder used for the present invention comprises polar groups having a salt structure as a hydrophilic group, and the resin powder is a partially cross-linked structure. As used herein, "partially cross-linked" means a state wherein functional groups that can be cross-linked by chemical bonding remain in a polymer molecule, a state wherein a polymer has a branched structure and forms a loose net structure during aggregation of the polymer molecule, or a state wherein a cross-linked gel easily changes its shape by combining with a linear polymer. Since the resin is partially cross-linked, the resin has water absorbing property while a part of the resin dissolves in water. A part of the dissolved resin adheres on the recording medium, and forms a layer on the recording medium depending on the degree of dissolution.

A monomer comprising a polar group can be previously converted to a monomer comprising a polar group having the salt structure, and then polymerized to give the resin powder. Alternatively, the monomer comprising a polar group can be previously polymerized, and then converted to salt to give the resin powder.

Examples of the polar groups that can be having the salt structure include carboxylic acid, sulfonic acid, onium and phosphoric acid, preferably carboxylic acid and onium. Examples of the monomer having a polar group that can be converted to salt include, for example, acrylic acid, methacrylic acid, arginic acid, amino(meth)acrylate onium salt (e.g., dimethylaminomethacrylate onium salt), maleic acid and vinyl acetate. Among these, acrylic acid, methacrylic acid, arginic acid, dimethylmethacrylate ammonium are preferred.

Preferable examples of the onium salt include chloride and bromide, more preferably chloride.

Preferable examples of the salt other than the onium salt include sodium salt, zinc salt, potassium salt, lithium salt and magnesium salt, more preferably sodium salt, zinc salt and potassium salt, and still more preferably potassium salt.

The resin powder used for the present invention includes a polar group having the salt structure, but it can include polar groups which don't have salt form (namely, residual polar groups).

In the resin powder used for the present invention, the composition ratio of the monomer having a polar group having the salt structure is preferably approximately not less than 10% to not more than 95%, more preferably approximately not less than 15% to not more than 90%, still more preferably approximately not less than 20% to not more than 85%.

Where the composition ratio exceeds approximately 95%, solubility in water increases and durability of the image decreases. Where the composition ratio is less than approximately 10%, sufficient fixing property cannot be obtained readily.

In the resin powder used for the present invention, the composition ratio of the monomer having a polar group having the salt structure can be adjusted to the above-mentioned range by (1) polymerizing a monomer having a polar group having the salt structure in advance by the above-mentioned monomer ratio, (2) polymerizing a monomer having polar groups being not salt form with other monomer and converting approximately 10% to 95% of the whole polar groups in the obtained resin into salt form by using a compound for forming salt (e.g., NaOH) by the mol ratio of approximately 10% to 95% relative to the polar groups in the obtained resin.

The resin powder used for the present invention can be a homopolymer constituted by repeating units comprising a polar group having the salt structure (a homopolymer of a monomer comprising polar groups in which a part of or whole of the polar groups have been converted to salt form), or can be a copolymer comprising repeating units comprising polar groups having the salt structure and repeating units free from polar groups. In the case where the latter copolymer is used, the ratio of the monomer comprising polar groups having the salt structure and the monomer free from polar group is preferably approximately 1:00 to 100:1, more preferably approximately 5:100 to 100:5, and still more preferably approximately 10:100 to 100:10. Where the ratio of the monomer comprising a polar group having the salt structure per one monomer free from polar group exceeds approximately 100, solubility of the resin powder in water increases, which lead to deterioration of durability of the image. On the other hand, where the ratio is less than approximately 0.01, sufficient fixing property cannot be obtained.

Examples of the monomer having a functional group free from polar group include, for example, vinyl alcohol, N-vinylpyrrolidone, vinylpyridinium, cationic modified vinyl alcohol, acrylamide, dimethylacrylamide, dimethylaminoacrylate, alkyl vinyl ether, acrylonitrile, substituted or unsubstituted styrene, ethylene, propylene, acrylic acid ester (e.g., methyl acrylate, ethyl acrylate, glycidyl acrylate, hydroxyethyl acrylate, n-butyl acrylate and t-butyl acrylate) and methacrylic acid ester (e.g., methyl methacrylate, ethyl methacrylate, glycidyl methacrylate, hydroxyethyl methacrylate, n-butyl methacrylate and t-butyl methacrylate).

In the case where the copolymer comprising repeating units comprising polar groups having the salt structure and repeating units free from polar groups is used, a part of the polar groups having the salt structure can be residual polar groups.

The particle size of the resin powder used for dispersing in the present invention is approximately not less than 0.1 µm to not more than 10 µm, preferably approximately not less than 0.2 µm to not more than 5 µm, more preferably approximately not less than 0.3 µm to not more than 3 µm. Where the particle size of the resin powder exceeds approximately 10 µm, the resin powder does not dissolve and the insoluble portion remains in the form of powder on the recording medium. If the resin powder dissolves partially, the shape of resin powder remains large powder. Therefore, fixing of the ink is prevented and image fastness cannot be improved. On the other hand, where the particle size of the resin powder is less than approximately 0.1 µm, the resin powder dissolves completely and permeates into the recording medium, whereby feathering and curling cannot be improved, fixing of ink is inhibited, and image fastness cannot be improved.

The weight average molecular weight of the resin powder is approximately not less than 8,000 to not more than 300,000, preferably approximately not less than 10,000 to not more than 100,000. Where the weight average molecular weight of the resin powder exceeds approximately 300,000, the resin powder does not dissolve partially and remains on the recording medium in the form of resin powder, whereby fixing of ink is inhibited and image fastness cannot be improved. On the other hand, where the weight average molecular weight of the resin powder is less than approximately 8,000, the resin powder dissolves completely and permeates into the recording medium, whereby feathering and curling cannot be improved, fixing of ink is inhibited, and image fastness cannot be improved.

Accordingly, the resin powder used for the present invention is designed so that it dissolves partially in a solvent of an aqueous ink (water and/or a water-soluble organic solvent) by suitably adjusting the ratio of polar groups having the salt structure and the residual polar groups, and/or the ratio of the polar groups having the salt structure and the functional groups free from polar groups in view of the molecular weight and the particle size of the resin powder used.

Any known method can be used for the polymerization using the above-mentioned monomers. For example, suspension polymerization method, emulsion polymerization method, dispersion polymerization method and seed polymerization method can be used preferably. Alternatively, emulsifying method known as membrane emulsion method can be used for suspension polymerization. Where necessary, a polymerization initiation catalyst well-known in the art can be used. Specific examples of the catalyst include organic peroxides such as diacyl peroxide, ketone peroxide and alkylhydroperoxide; inorganic peroxides such as hydrogen peroxide and ozone; oil-soluble azo organic compounds such as azobisvaleronitrile (AIBN; trade name: V-60 manufactured by Wako Pure Chemical Co., Ltd.), 2,2'-azobis(2-methylbutyronitrile) (trade name: V-59 manufactured by Wako Pure Chemical Co., Ltd.) and 2,2'-azobis(2,4-dimethylvaleronitrile) (trade name: V-65 manufactured by Wako Pure Chemical Co., Ltd.); water-soluble azo organic compounds such as 2,2'-azobis(2-amidinopropane)diacid salt (trade name: V-50 manufactured by Wako Pure Chemical Co., Ltd.), 2,2'-azobis[2-methyl-N-2-hydroxyethyl)propionamide] (trade name: VA086 manufactured by Wako Pure Chemical Co., Ltd.) and 2,2'-azobis[2-2imidazolin-2-yl)propane]diacid salt (trade name: VA044 manufactured by Wako Pure Chemical Co., Ltd.). When the polymerization initiator is used, it is used in the amount sufficient for initiate the polymerization favorably, and such amount is well-known in the art. Generally, it is preferable to use the initiator by the amount of approximately 0.1 to 5.0 mass %.

In addition to adjust its molecular weight and particle size, the resin powder has a partially cross-linked structure in order to control its solubility in the solvent in the aqueous ink. The method for forming cross-linked structure can be any conventional method, and examples thereof include, but are not limited to, addition of a cross-linking agent and irradiation of electromagnetic wave, electron beam or corpuscular beam. The kind of the cross-linking agent is not specifically limited, and divinylbenzene, urea resins and melamine resins can be applied. Alternatively, it is preferable to convert the resin powder to an ionomer having an ion-associated phase. The ionomer can be prepared by a known method.

The powder can be prepared by using a suitable conventional method. For example, the resin prepared by suspension polymerization can be pulverized into particles having small particle size by the combination of high mechanical shearing force and a dispersion stabilizing agent, or fine resin powder can be prepared by emulsion polymerization method. Alternatively, ordinal pulverizing method, pulverizing method after melt mixing, or spray drying method can be used.

The resin powder can have a property of coagulating a colorant in an aqueous ink. Examples of the substance that coagulates a colorant in an aqueous ink include electrolytes such as a salt of an alkaline metal ion (e.g. lithium ion, sodium ion) or a multivalent metal cation (e.g. potassium ion, and aluminum ion, barium ion, calcium ion, copper ion, iron ion, magnesium ion, manganese ion, nickel ion, tin ion, titanium ion and zinc ion) with an anion derived from an oxo acid (e.g., hydrochloric acid, hydrobromic acid, hydroiodic acid, sulfuric acid, nitric acid, phosphoric acid and thiocyanic acid), an anion derived from an organic carboxylic acid (e.g., acetic acid, oxalic acid, lactic acid, fumaric acid, citric acid, salicylic acid and benzoic acid) or an anion derived from an organic sulfonic acid. Alternatively, a cationic electrolyte that dissociates in water to give an organic cation can be used.

Specific examples of the electrolyte include, for example, 1) alkaline metal salts such as lithium chloride, sodium chloride, potassium chloride, sodium bromide, potassium bromide, sodium iodide, potassium iodide, sodium sulfate, potassium nitrate, sodium acetate, potassium oxalate, sodium citrate and potassium benzoate, 2) multivalent metal salts such as aluminum chloride, aluminum bromide, aluminum sulfate, aluminum nitrate, sodium aluminum sulfate, potassium aluminum sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogenphosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, zinc acetate, calcium carbonate and magnesium carbonate.

Specific examples of the cationic electrolyte include tetraalkylammonium salts, alkylamine salts, benzalkonium salts, alkylpyridium salts, imidazolium salts and polyamines (e.g., hexamethylenediamine, tetraethylenepentamine, tetramethylammonium chloride, tetraethylammonium bromide, dihydroxyethylstearylamine, 2-heptadecenylhydroxyethylimidazoline, lauryldimethylbenzylammonium chloride, cetylpyridinium chloride, stearamidemethylpyridium chloride, diallyldimethylammonium chloride polymer, diallylamine polymer and monoallylamine polymer).

Among the above-mentioned electrolytes, aluminum sulfate, calcium carbonate, calcium chloride, calcium nitrate, calcium acetate, magnesium chloride, magnesium nitrate, magnesium sulfate, magnesium acetate, tin sulfate, zinc chloride, zinc nitrate, zinc sulfate, zinc acetate, aluminum nitrate, monoallylamine polymer, diallylamine polymer and diallyldimethylammonium chloride polymer are preferably used, since they can coagulate a pigment to prevent inter-color bleeding to improve image quality remarkably.

Where the above-mentioned electrolyte is used as a resin powder, it is preferable to use a compound comprising multivalent metal or a compound that shows opposite polarity from that of the functional groups on the surface of the colorant.

In addition, an antistatic agent can be added to the resin powder. The antistatic agent can be any known compound such as nigrocine dyes, benzimidazole compounds, quaternary ammonium salt compounds, alkoxylated amines, alkylamides, molybdate chelate pigments, triphenylmethane compounds, salicylic acid metal salt complexes, azo chromium complexes and copper phthalocyanine. Specifically preferable examples thereof include quaternary ammonium salt compounds, alkoxylated amines and alkylamides. These antistatic agents are easy to control their dispersion state.

The amount of the antistatic agent to be added to the resin powder is generally in the range of approximately 0.1 to 10 mass %, and more preferably approximately 0.5 to 8 mass %.

The resin powder can include an inorganic ingredient such as water-absorbing silicon dioxide or titanium dioxide. The velocity of absorbing water of the resin powder can be increased by adding the inorganic ingredient to the resin powder.

The amount of the resin powder to be applied on the recording medium (per unit area) is preferably approximately not less than 0.1 $g/m^2$ to not more than 30 $g/m^2$, more preferably approximately not less than 0.5 $g/m^2$ to not more than 20 $g/m^2$, still more preferably approximately not less than 1 $g/m^2$ to not more than 15 $g/m^2$. Where the amount of the resin powder applied on the recording medium (per unit area) exceeds approximately 30 $g/m^2$, the resin powder adheres to a printer head to clog up a nozzle, which may cause ejection deficiency. On the other hand, where the amount of the resin powder applied on the recording medium (per unit area) is less than approximately 0.1 $g/m^2$, improvement on image quality by preventing inter-color bleeding tends to become insufficient.

In addition, inorganic microparticles such as silicon dioxide (hydrophobic silica), titanium dioxide, alumina, magnesium carbonate, talc (magnesium hydrated silicate mineral) and clay (hydrated silicate mineral of metal), or organic microparticles such as polyethylene and PTFE resin can be used in combination with the above-mentioned resin powder. Using the microparticles in combination, the solvent in the ink can be absorbed effectively, which allows remarkable improvement on image quality by preventing inter-color bleeding.

The particle size of the microparticles is preferably smaller than that of the resin powder because the microparticles having such particle size can be absorbed by the surface of the resin powder to provide flow property. Preferably, the particle size is approximately 1/10 to 1/1000 of that of the resin powder.

2. Ink

The ink used for the present invention is an aqueous ink, because the resin powder is designed to be partially dissolved in water or a water-soluble organic solvent. However, the aqueous ink is not specifically limited.

Generally, an aqueous ink comprises at least a colorant, a water-soluble organic solvent and water, and such aqueous ink is used for the present invention.

Preferable examples of the colorant included in the aqueous ink used for the present invention include, but are not limited to, pigments and dyes.

Where a pigment is used, either an organic pigment or an inorganic pigment can be used. Examples of the pigment to be used include black pigments, three elementary pigments (i.e., cyan pigments, magenta pigments and yellow pigments), specific color pigments such as red, green, blue, brown and white, metal gloss pigments such as gold and silver, body pigments such as colorless and pale color, and plastic pigments. Alternatively, a pigment newly synthesized for the present invention can be used.

Examples of the black pigment include carbon black pigments such as furnace black, lamp black, acetylene black and channel black. Examples of the cyan pigment include C. I. Pigment Blue-1, -2, -3, -15, -15:1, -15:2, -15:3, -15:4, -16, -22 and -60. Examples of the magenta pigment include C. I. Pigment Red-5, -7, -12, -48, -48:1, -57, -112, -122, -123, -146, -168, -184 and -202. Examples of the yellow pigment include C. I. Pigment Yellow-1, -2, -3, -12, -13, -14, -16, -17, -73, -74, -75, -83, -93, -95, -97, -98, -114, -128, -129, -138, -151 and -154.

For example, there may be exemplified, Raven7000, Raven5750, Raven5250, Raven5000 ULTRAII, Raven3500, Raven2000, Raven1500, Raven1250, Raven1200, Raven1190 ULTRAII, Raven1170, Raven1255, Raven1080, Raven1060 (above, manufactured by Columbian Carbon Company), Rega1400R, Rega1330R, Rega1660R, Mogul L, Black Pearls L, Monarch700, Monarch800, Monarch880, Monarch900, Monarch1000, Monarch1OO, Monarch1300, Monarch1400 (above, manufactured by Cabot Corporation), Color Black FW1, Color Black FW2, Color Black FW2V, Color Black18, Color Black FW200, Color Black S150, Color Black S160, Color Black S170, Printex35, Printex U, Printex V, Printex140U, Printex140V, Special Black6, Special Black5, Special Black4A, Special Black4 (above, manufactured by Degussa AG), No. 25, No. 33, No. 40, N. 47, No. 52, No900, No. 2300, MCF-88, MA600, MA7, MA8, MA100 (above, manufactured by Mitusbishi Chemical corporaion)

Alternatively, a pigment that can be self-dispersed in water can be used for the present invention. As used herein, the "pigment that can be self-dispersed in water" used for the present invention means a pigment that satisfies the condition based on the concentration of the pigment measured by the following procedure explained below, has functional groups that can be dissolved in water on the surface of the pigment, and that can be dispersed stably in water without using a polymer dispersing agent. The procedure comprises adding a pigment to water so that the amount of water becomes approximately 95 mass % and that the amount of the pigment becomes approximately 5 mass %; dispersing the pigment in water using an ultrasonic homogenizer and leaving the dispersion to stand for approximately 24 hours in a glass bottle; taking the supernatant from the dispersion liquid of the obtained pigment by the volume of approximately one third of the whole volume of the dispersion liquid; and measuring the pigment concentration in the supernatant of the dispersion liquid. Where the pigment concentration is approximately not less than 98% relative to the pigment concentration in the dispersion liquid immediately after dispersion, the pigment is determined to be a pigment that can be self-dispersed in water. Such pigment that can be self-dispersed in water can be obtained by subjecting an ordinally pigment to surface reforming treatment such as treatment by an acid or a base, treatment by a coupling agent, polymer grafting treatment, plasma treatment, or oxidation or reduction treatment.

The pigment that can be self-dispersed in water is not specifically limited so long as it is a pigment that satisfies the above-mentioned condition. For example, a pigment obtained by subjecting the above-mentioned pigment to surface reforming treatment, and commercially available self-dispersion pigments such as Cab-o-jet-200, Cab-o-jet-300, IJX-55, IJX-253, IJX-266 and IJX-273 (trade names, manufactured by Cabot Corporation), Microjet Black CW-1 and CW-2 (trade names, manufactured by Orient Chemical Industries, Ltd.) and self-dispersion pigments (manufactured by Nippon Shokubai Co., Ltd.) can be used. Alternatively, a pigment that can be self-dispersed in water synthesized from a conventional pigment by the above-mentioned method can be used.

Where a dye is used, any of water-soluble dyes, oily dyes and dispersion dyes can be used. Examples of the water-soluble dye include, C.I. Direct Black-2, -4, -9, -11, -17, -19, -22, -32, -80, -151, -154, -168, -171, -194, -195, C.I. Direct Blue-1, -2, -6, -8, -22, -34, -70, -71, -76, -78, -86, -112, -142, -165, -199, -200, -201, -202, -203, -207, -218, -236, -287, -307, C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, -227, CJ, Direct Yellow-1, -2, -4, -8, -11, -12, -26, -27, -28, -33, -34, -41, -44, -48, -58, -86, -87, -88, -132, -135, -142, -144, -173, C.I. Food Black-1-2, C.I. Acid Black-1, -2, -7, -16, -24, -26, -28, -31, -48, -112, -118, -119, -121, -156, -172, -194, -208, C.I. Acid Blue-1, -7, -9, -15, -22, -23, -27, -29, -40, -43, -55, -59, -62, -78, -80, -81, -83, -90, -102, -104, -111, -185, -249, -254, C.I. Acid Red -1, -4, -8, -13, -14, -15, -18, -21, -26, -35, -37, -52, -110, -144, -180, -249, -257, -289, C.I. Acid Yellow-1, -3, -4, -7, -11, -12, -13, -14, -18, -19, -23, -25, -34, -38, -41, -42, -44, -53, -55, -61, -71, -76, -78, -79, -122.

The amount of the colorant to be included in the above-mentioned aqueous ink is preferably approximately 0.5 to 20 mass %, more preferably approximately 1 to 10 mass % relative to the total mass of the aqueous ink. Where the content is less than approximately 0.5 mass %, the optical concentration tends to become insufficient. On the other hand, where the content exceeds approximately 20 mass %, the ink tends to become difficult to be sprayed smoothly on the recording medium such as plain paper.

The water-soluble organic solvent to be included in the inkjet ink for the present invention is not specifically limited so long as it is water-soluble. Example thereof include multivalent alcohols, multivalent alcohol derivatives, nitrogen-containing solvents, alcohols, sulfur-containing solvents, propylene carbonate and ethylene carbonate. Examples of the multivalent alcohols include ethylene glycol, diethylene glycol, propylene glycol, butylene glycol, triethylene glycol, 1,5-pentanediol, 1,2,6-hexanetriol and glycerin. Examples of the multivalent alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether and an ethyleneoxide adduct of diglycerin. Examples of the nitrogen-containing solvents include pyrrolidone, N-methyl-2-pyrrolidone, cyclohexylpyrrolidone and triethanolamine. Examples of the alcohols include ethanol, isopropylalcohol, butylalcohol and benzylalcohol. Examples of the sulfir-containing solvents include thiodiethanol, thiodiglycerol, sulforane and dimethylsulfoxide.

As the water-soluble organic solvent included in the aqueous ink used for the present invention, one kind of solvent can be used solely, or a mixed solvent of two or more kinds of solvents can be used. The content of the water-soluble organic solvent in the aqueous ink is preferably approximately 1 to 60 mass %, more preferably approximately 5 to 40 mass % relative to the total mass of the aqueous ink. Where the content of the water-soluble organic solvent is less than approximately 1 mass %, the optical concentration tends to become insufficient. On the other hand, where the content of the water-soluble organic solvent exceeds 60 mass %, quick-drying property of the aqueous ink on the recording medium tends to become insufficient.

In the present invention, a polymer dispersing agent can be added so that the pigment can be dispersed favorably in the aqueous ink. For such polymer dispersing agent, any of non-ionic compounds, anionic compounds, cationic compounds and amphoteric compounds can be used.

For example, an alkyleneoxide adduct of a multivalent alcohol can be used. Specific examples thereof include compounds obtained by adding alkyleneoxide groups such as ethyleneoxide, propyleneoxide and butyleneoxide to a multivalent alcohol such as ethanediol, propanediol, butanediol, hexanediol, glycerin, trimethylolpropane and pentaerythritol. More specific examples include polyoxyethylene glycol, polyoxypropylene glycol, polyoxyethylene-polyoxypropylene copolymer glycol and polyoxyethylene-polyoxybutylene copolymer glycol.

A copolymer formated with a monomer having an $\alpha,\beta$-ethylenically unsaturated group can be used as a polymer compound. Examples of the monomer having an $\alpha,\beta$-ethylenically unsaturated group include acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid, sulfonated vinylnaphthalene, vinyl alcohol, acrylamide, methacryloxyethylphosphate, bismethacryloxyethyl phosphate, methacryloxyethylphenyl acid phosphate, ethylene glycol dimethacrylate, diethylene glycol dimethacrylate, styrene derivatives (e.g., styrene, $\alpha$-methylstyrene and vinyltoluene), vinylcyclohexane, vinylnaphthalene, vinylnaphthalene derivative, acrylic acid alkyl ester, acrylic acid phenyl ester, methacrylic acid alkyl ester, methacrylic acid phenyl ester, methacrylic acid cycloalkyl ester, crotonic acid alkyl ester, itaconic acid dialkyl ester and maleic acid dialkyl ester.

Examples of the copolymer of the monomer having an $\alpha,\beta$-ethylenically unsaturated group include copolymers obtained from at least one kind of the above-mentioned monomers having an $\alpha,\beta$-ethylenically unsaturated group. Specific examples include polyvinyl alcohol, polyvinylpyrrolidone, styrene-styrenesulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, acrylic acid alkyl ester-acrylic acid copolymer, methacrylic acid alkyl ester-methacrylic acid, styrene-methacrylic acid alkyl ester-methacrylic acid copolymer, styrene-acrylic acid alkyl ester-acrylic acid copolymer, styrene-methacrylic acid phenylester-methacrylic acid copolymer and styrene-methacrylic acid cyclohexylester-methacrylic acid copolymer.

The weight average molecular weight of the polymer dispersing agent included in the aqueous ink used for the present invention is preferably approximately 2000 to 15000, more preferably approximately 3500 to 10000. Where the molecular weight of the polymer dispersing agent is less than approximately 2000, stable dispersion of the pigment in aqueous ink tends to become difficult. On the other hand, where the weight average molecular weight exceeds approximately 15000, the viscosity of the aqueous ink tends to increase, which leads to deterioration of ejection property.

The content of the polymer compound to be included in the aqueous ink used for the present invention is preferably approximately 0.1 to 3 mass %, more preferably approximately 0.2 to 2.5 mass %, still more preferably approximately 0.15 to 2 mass % relative to the total mass of the ink. Where the content of the polymer compound is less than approximately 0.1 mass %, feathering of the ink tends to become remarkable. On the other hand, where the content of the polymer compound exceeds approximately 3 mass %, smooth spraying of the ink on the recording medium such as plain paper tends to be carried out with difficulty.

In the present invention, the content of water included in the aqueous ink is preferably approximately 14 to 98.4 mass %, more preferably approximately 40 to 90 mass % relative to the mass of the ink. Where the content of water is less than approximately 14 mass %, smooth spraying of ink from the nozzle tends to become difficult. On the other hand, where the content of water exceeds approximately 98.4 mass %, long-time storage property tends to decrease.

Where necessary, the following additives can be added to the aqueous ink used for the present invention besides the above-mentioned ingredients.

That is, for example, in order to control the spraying property of the ink or to improve long-time storage stability, the following compound can be used: polyethyleneimine; polyamines; polyvinylpyrrolidone; polyethylene glycol; cellulose derivatives such as ethylcellulose and carboxymethylcellulose; polysaccharides and derivatives thereof; other water-soluble polymers; polymer emulsions such as acrylic polymer emulsion and polyurethane emulsion; cyclodextrin; macrocyclic amines; dendrimer; crown ethers; urea and derivatives thereof; and acetamide.

In addition, in order to adjust electroconductivity or pH, alkaline metal compounds such as potassium hydroxide, sodium hydroxide and lithium hydroxide; nitrogen-containing compounds such as ammonium hydroxide, triethanolamine, diethanolamine, ethanolamine and 2-amino-2-methyl-1-propanol; alkaline earth metal compounds such as calcium hydroxide; and acids such as sulfuric acid, hydrochloric acid and nitric acid or salts consisted of strong acids and weak alkalines such as ammonium sulfate can be used.

In addition, pH buffers, antioxidants, antimycotic agents, viscosity adjusting agents, electroconductive agents, ultraviolet absorbing agents and chelating agents, and water-soluble dyes, dispersion dyes and oil-soluble dyes can be added.

The viscosity of the ink is preferably approximately not less than 2 mPa·S to 10 mPa·S, more preferably approximately not less than 3 mPa·S to not more than 5 mPa·S so as to ensure stable ejection property. Where the viscosity of ink exceeds approximately 10 mPa·s, the quick-drying property of the ink tends to be remarkably decreased, because where the ink has such viscosity, permeability of the ink into the recording medium such as paper remarkably decreases. On the other hand, where the viscosity of the ink is less than approximately 2 mPa·s, optical concentration tends to become insufficient. This is considered due to remarkable increase of the permeability of the ink to the recording medium such as paper.

The surface tension of the ink is not specifically limited so long it is in the range in which the solvent in the ink is quickly absorbed by the above-mentioned resin powder, and is preferably approximately not less than 20 mN/m to not more than 50 mN/m, more preferably approximately not less than 25 mN/m to not more than 35 mN/m so as to increase drying property.

3. Other Materials

In the present invention, a liquid composition that reacts with the ink can be used besides the ink. As used herein, "reacts with the ink" refers to formation of a chemical bond. Specifically, formation of an ionic bond is preferred. By forming a chemical bond, the viscosity of the ink can be improved and coagulation of the ink become possible.

The liquid composition comprises at least a coagulating agent. The coagulating agent used for the present invention refers to a substance that can increase the viscosity of the ink or coagulate the ink by reacting or interacting with the ingredients in the ink. Examples of such substance include multivalent metal ions and cationic substances. Specifically, the following inorganic electrolytes, organic amine compounds and organic acids are effectively used.

Examples of the inorganic electrolyte include salts of alkaline metal ions (e.g., lithium ion, sodium ion and potassium ion) or multivalent metal ions (e.g., aluminum ion, barium ion, calcium ion, copper ion, iron ion, magnesium ion, manganese ion, nickel ion, tin ion, titanium ion and zinc ion) with hydrochloric acid, hydrobromic acid, hydroiodic acid, sulfuric acid, nitric acid, phosphoric acid, thiocyanic acid, organic carboxylic acids (e.g., acetic acid, oxalic acid, lactic acid, fumaric acid, citric acid, salicylic acid, benzoic acid), or organic sulfonic acids.

Specific examples include alkaline metal salts such as lithium chloride, sodium chloride, potassium chloride, sodium bromide, potassium bromide, sodium iodide, potassium iodide, sodium sulfate, potassium nitrate, sodium acetate, potassium oxalate, sodium citrate and potassium benzoate; and salts of multivalent metals such as aluminum chloride, aluminum bromide, aluminum sulfate, aluminum nitrate, sodium aluminum sulfate, potassium aluminum sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogenphosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate and zinc acetate.

Examples of the organic amine compound include primary, secondary, tertiary and quaternary amines and salts thereof.

Specific examples include tetraalkylammonium salts, alkylamine salts, benzalkonium salts, alkylpyridium salts, imidazolium salts and polyamines, for example, isopropylamine, isobutylamine, t-butylamine, 2-ethylhexylamine, nonylamine, dipropylamine, diethylamine, trimethylamine, triethylamine, dimethylpropylamine, ethylenediamine, propylenediamine, hexamethylenediamine, diethylenetriamine, tetraethylenepentamine, diethanolamine, diethylethanolamine, triethanolamine, tetramethylammonium chloride, tetraethylammonium bromide, dihydroxyethylstearylamine, 2-heptadecenyl-hydroxyethylimidazoline, lauryldimethylbenzylammonium chloride, cetylpyridinium chloride, stearamidemethylpyridium chloride, diallyldimethylammonium chloride polymers, diallylamine polymers and monoallylamine polymers; onium salts of these compounds such as sulfonium salts and phosphonium salts; and phosphoric acid esters of these compounds.

Preferable organic acid is a compound represented by Formula (1):

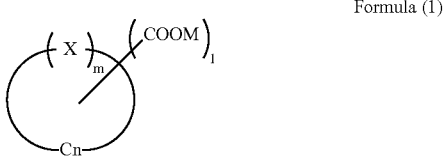

Formula (1)

wherein X is O, CO, NH, NR, S or $SO_2$, preferably CO, NH, NR or O; more preferably CO, NH or O; R is an alkyl group optionally having substituent(s), preferably $CH_3$, $C_2H_5$ or $C_2H_4OH$; M is a hydrogen atom, an alkaline metal or an amine, preferably hydrogen atom, lithium atom, sodium atom, potassium atom, a monoethanolamine, a diethanolamine or a triethanolamine, more preferably a hydrogen atom, sodium atom or potassium atom, still more preferably a hydrogen atom; n is an integer of 3 to 7, preferably an integer that makes the heterocycle a 6- or 5-membered ring, more preferably an integer that makes the heterocycle a 5-membered ring; m is 1 or 2; and l is an integer of 1 to 5. The compound represented by Formula (1) can be a saturated ring or an unsaturated ring so long it is a heterocycle.

The compound represented by Formula (1) is specifically a compound having a structure selected from furan, pyrrole, pyrroline, pyrrolidone, pyrrone, pyrrole, thiophene, indole, pyridine and quinoline, and having carboxyl group(s) as a functional group. Specific examples thereof include 2-pyrrolidone-5-carboxylic acid, 4-methyl-4-pentanolide-3-carboxylic acid, furancarboxylic acid, 2-benzofurancarboxylic acid, 5-methyl-2-furancarboxylic acid, 2,5-dimethyl-3-furancarboxylic acid, 2,5-furandicarboxylic acid, 4-butanolide-3-carboxylic acid, 3-hydroxy-4-pyrrone-2,6-dicarboxylic acid, 2-pyrrone-6-carboxylic acid, 4-pyrrone-2-carboxylic acid, 5-hydroxy-4-pyrrone-5-carboxylic acid, 4-pyrrone-2,6-dicarboxylic acid, 3-hydroxy-4-pyrrone-2,6-dicarboxylic acid, thiophenecarboxylic acid, 2-pyrrolecarboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidinecarboxylic acid, 4-hydroxypyrroline, 1-methylpyrrolidine-2-carboxylic acid, 5-carboxy-1-methylpyrrolidine-2-acetic acid, 2-pyridinecarboxylic acid, 3-pyridinecarboxylic acid, 4-pyridinecarboxylic acid, pyridinedicarboxylic acid, pyridinetricarboxylic acid, pyridinepentacarboxylic acid, 1,2,5,6-tetrahydro-1-methylnicotinic acid, 2-quinolinecarboxylic acid, 4-quinolinecarboxylic acid, 2-phenyl-4-quinolinecarboxylic acid, 4-hydroxy-2-quinolinecarboxylic acid and 6-methoxy-4-quinolinecarboxylic acid, and derivatives of these compounds, and salts thereof.

Preferable examples of the compound represented by Formula (1) include pyrrolidonecarboxylic acid, pyrronecarboxylic acid, pyrrolecarboxylic acid, furancarboxylic acid, pyridinecarboxylic acid, coumaric acid, thiophenecarboxylic acid, nicotinic acid and derivatives of these compounds, and salts thereof. More preferable examples include pyrrolidonecarboxylic acid, pyrronecarboxylic acid, furancarboxylic acid and coumaric acid, and derivatives of these compounds, and salts thereof.

Among these, preferable examples include magnesium chloride, magnesium bromide, magnesium iodide, magnesium sulfate, magnesium nitrate, magnesium acetate, calcium chloride, calcium bromide, calcium nitrate, calcium dihydrogenphosphate, calcium benzoate, calcium acetate, calcium tartrate, calcium lactate, calcium fumarate, calcium citrate, diallyldimethylammonium chloride polymers, diallylamine polymers, monoallylamine polymers, pyrrolidonecarboxylic acid, pyrronecarboxylic acid, pyrrolecarboxylic acid, furancarboxylic acid, pyridinecarboxylic acid, coumaric acid, thiophenecarboxylic acid, nicotinic acid, potassium dihydrogencitrate, succinic acid, tartaric acid, lactic acid and potassium hydrogenphthalate and derivatives of these compounds, and salts thereof. More preferable examples include magnesium chloride, magnesium nitrate, calcium nitrate, diallylamine polymer, pyrrolidonecarboxylic acid, pyrronecarboxylic acid, furancarboxylic acid and coumaric acid, and derivatives of these compounds, and salts thereof.

In the present invention, one kind or two or more kinds of coagulating agent can be used.

The amount of the coagulating agent to be added to the liquid composition is approximately not less than 0.01 mass % to not more than 30 mass %, more preferably approximately not less than 0.1 mass % to not more than 15 mass %, still more preferably approximately not less than 0.25 mass % to not more than 10 mass % relative to the total mass of the liquid composition. Where the amount of the coagulating agent to be added to the liquid composition is less than approximately 0.01 mass %, aggregation of the colorant becomes insufficient upon contacting with the ink, which may deteriorate optical concentration, feathering and intercolor bleeding. On the other hand, where the amount to be added exceeds approximately 30 mass %, spraying property may be deteriorated, which may lead to abnormal spraying of the liquid.

As the water-soluble solvent used for the liquid composition, water-soluble solvents similar to that for the ink can be used.

The content of the water-soluble solvent is approximately not less than 1 mass % to not more than 60 mass %, preferably approximately not less than 5 mass % to not more than 40 mass % relative to the total mass of the liquid composition. Where the amount of the water-soluble solvent in the liquid composition is less than approximately 1 mass %, sufficient optical concentration may not be obtained. On the other hand, where the amount is more than approximately 60 mass %, the viscosity of the liquid increases, which may make the spraying property of the liquid unstable.

The viscosity of the liquid composition is preferably approximately not less than 2 mPa·S to not more than 10 mPa·S, more preferably approximately not less-than 3 mPa·S to not more than 5 mPa·S in order to ensure stable ejection property. The surface tension of the liquid composition is preferably approximately not less than 20 mN/m to not more than 50 mN/m, more preferably approximately not less than 25 mN/m to not more than 35 mN/m in order to enhance drying property.

The number of coarse particles of not less than 5 μm in a mixed liquid of an ink and a liquid composition is preferably approximately not less than 500 particles/μL, more preferably approximately not less than 500 particles/μL to not more than 10,000 particles/μL, still more preferably approximately not less than 500 particles/μL to not more than 3,000 particles/μL. Where the number of coarse particles of not less than 5 μm in the mixed liquid of the ink and the liquid composition is less than approximately 500 particles/μL, the optical concentration may decrease.

In the present invention, the number of coarse particles of not less than 5 μm in the mixed liquid of the ink and liquid composition is measured by mixing two liquids by the mass ratio of 1:1, taking 2 μL of the liquid while the mixture is stirring, and measuring using Accusizer TM770 Optical Particle Sizer (trade name, manufactured by Particle Sizing Systems). As the parameter for measurement, the density of the colorant is input as the density of the dispersed particles. The density of the colorant can be determined by measuring the powder of the colorant obtained by heating and drying the colorant dispersion liquid using a densitometer or a specific gravity bottle.

Water is added to the liquid composition by the amount that can adjust the surface tension and the viscosity within the above-mentioned range. Although the amount to be added of water is not specifically limited, it is preferably approximately not less than 10 mass % to not more than 99 mass %, more preferably approximately not less than 30 mass % to not more than 80 mass % relative to total mass of the liquid composition.

Where necessary, the liquid composition can comprise a colorant. As the colorant to be included in the liquid composition, colorants explained for the colorant for the ink can be used. Preferably, dyes, pigments having sulfonic acid or sulfonate on the surface, anionic self-dispersion pigments or cationic self-dispersion pigments can be used. These colorants are preferable since they are difficult to coagulate in the acidic area and have an effect of improving the storage stability of the liquid composition.

4. Inkjet Printing Method 4-1. First Inkjet Printing Method

The first inkjet printing method of the present invention comprises (1) providing powder by dispersing the above-mentioned resin powder to the surface of the recording medium and (2) forming an image by ejecting the ink to the surface of the recording medium.

The recording medium that can be used for the inkjet printing method of the present invention is not specifically limited. Not only a recording medium having permeability but also a non-permeable recording medium having very low liquid permeability can be used. Examples of the recording medium that can be used for the present invention include, for example, plain paper, OHP sheets, gloss paper, coat paper, art paper, polyfilms and fabrics. Examples of the plain paper include, for example, L paper, Multiace paper, M paper, P paper, S paper, R paper, WR paper, WR100 paper and Green 100 paper (trade names, all manufactured by Fuji Xerox Office Supply Co., Ltd.).

In the first inkjet printing method of the present invention, where a permeable recording medium such as plain paper is used as a recording medium, it is preferable that the method comprises forming an image by ejecting the ink to the surface of the recording medium after providing powder by dispersing (spraying) the resin powder on the surface of the recording medium. Because the ink permeates into the recording medium, the solvent in the ink can be absorbed effectively into the resin powder by dispersing the resin powder on the recording medium in advance, whereby the resin powder is partially dissolved by the solvent and forms a layer on the surface of the recording medium and the layer remarkably increases the fixing property of the ink. The ink can be provided at any timing after dispersion of the resin powder is finished, preferably within approximately not more than 0.1 seconds after dispersing the resin powder.

However, where the timing of dispersing the powder from a powder supplying unit after the the ink is ejected and the amount of the powder to be supplied can be precisely controlled so that the ink dropped on the surface of the recording medium does not spread in the derection of the surface to the extent that feathering or inter-color bleeding occurs and so that the ink does not permeate into the internal portion of the recording medium to the extent that the optical concentration of the printed image becomes insufficient, the resin powder can be dispersed after the ink ejects to the surface of the recording medium.

Where a permeable recording medium and a liquid composition are used, it is preferable that first the resin powder is dispersed to the surface of the recording medium; second the liquid composition is ejected to the surface of the recording medium; and that finally the ink is ejected to the surface of the recording medium. The ink can be provided at any time after the liquid composition is ejected, preferably within approximately not more than 0.1 seconds after the liquid composition is ejected.

Where a non-permeable recording medium such as gloss paper is used as a recording medium, it is preferable that the method of the present invention comprises providing powder by dispersing the resin powder to the surface of the recording medium after forming an image by ejecting the ink to the surface of the recording medium. Since the moisture which dissolves the resin powder is not absorbed by the recording medium, dispersing the resin powder after ejection of the ink causes the resin powder to form a membrane on the surface of the colorant, thus improving fixing properties. The resin powder can be provided at any time after application of the ink is finished, preferably within not more than approximately 0.1 seconds after application of the ink is finished.

Where the timing of dispersing the powder after the ejection of the ink and the amount of the powder to be supplied can be precisely controlled, the ink can be ejected after the resin powder is dispersed on the surface of the recording medium.

Where a non-permeable recording medium and a liquid composition are used, it is preferable that the liquid composition is first ejected on the surface of the recording medium; second the ink is ejected on the surface of the recording medium; and finally the resin powder is dispersed on the surface of the recording medium. The ink can be ejected at any time after ejection of the liquid composition is finished, and preferably within not more than approximately 0.1 seconds after ejection of the liquid composition is finished.

Upon providing powder in the present invention, a method of dispersing the resin powder unit is not specifically limited and known methods for powder dispersion can be used. Examples of such powder dispersion methods include a fluidized dipping method, a static fume method, a thermal spraying method, a static drying spraying method and a scattering method. Alternatively, the resin powder can be dispersed using a container comprising a lid having an open and close system that can store the powder in an internal portion thereof. In this case, the dispersion of the resin powder can be precisely controlled by using a control method that opens the lid only when the recording medium passes in order to disperse the resin powder on the recording medium and closes the lid in order to not disperse the resin powder where the recording medium is not used.

In the first inkjet printing method of the present invention, the methods for forming an image and for ejection of the ink are not specifically limited so long as the method comprises the above-mentioned steps for providing powder and for forming an image. For example, the method can comprise known systems such as a piezo inkjet printing method and a heat inkjet printing method.

Where an aqueous ink is used, it is preferable to adopt a heat inkjet recording system since the system has an effect of improving image quality by preventing feathering and inter-color bleeding. Although the reason has not been found, it is considered that, where the heat inkjet recording system is used, the viscosity of the ink is low during ejection due to heat but drastically increases after dropping of the ink on the recording medium in accordance with decrease of the temperature, whereby an effect of suppressing spreading of the ink on the recording medium is obtained. On the other hand, where an oily ink is used, a piezo inkjet printing method is preferable in view of the ejection property of the ink.

Where the heat inkjet recording system is adopted in the first inkjet printing method of the present invention, it is preferable that one drop is formed by applying multiple pulses to the ink, because spraying stability of the ink from a nozzle can be improved and cogation of the ink on a heater can be suppressed.

In the first inkjet printing method of the present invention, the drop amount of the inkjet ink is preferably approximately not more than 20 pL, more preferably approximately 5 pL to 18 pL, and still more preferably approximately 10 pL to 16 pL. The contact angle of the ink on the recording medium changes depending on the drop amount of the ink, and where the drop amount of the ink increases, the contact angle decreases accordingly. Therefore, by controlling the drop amount of the ink in the range of approximately not more than 20 pL, permeation of the ink into the recording medium and diffusion of the ink in the direction of the surface of the recording medium surface can be controlled suitably and easily such that sufficient quick-drying property and sufficient optical concentration after printing can be obtained. Where the drop amount of the ink exceeds approximately 20 pL, feathering during printing tends to occur to a remarkable degree.

The first inkjet printing method of the present invention can comprise an additional smoothing an image besides the above-mentioned providing powder and forming an image. When the ink is ejected to the recording medium, the ink mainly adheres to the surface of the recording medium. Therefore, where the ink is filled into the recording medium after formation of the image by pressurizing using an image smoothing unit, the ink is filled in the recording medium with high density and the surface becomes smooth. As a result, the fastness of the image can be remarkably enhanced and unevenness of the image surface can be suppressed, which also contributes to the improvement of operation properties during printing.

The method for pressurizing as used herein is not specifically limited, and examples thereof include methods using objects formed of a known shape such as a body having a circular cross-section like a so-called roller (e.g., a circular or cylindrical body having a certain inner diameter) or a plane-shaped plate body; for example, methods using a pair of rollers or two pressurized plates.

For example, a method for smoothing an image comprises a method of passing the recording medium between a pair of rollers rotating while pressure-contacting each other.

Although the pressure applied during pressurization varies depending on the basic weight of recording medium, the viscosity and amount of ink to be ejected and the amount of resin powder to be dispersed, it is preferably approximately not less than 2 MPa, more preferably approximately 4 MPa to 6.5 MPa. Where the pressure is less than approximately 2 MPa, the ink cannot be filled sufficiently into the recording medium, whereby an image having sufficient fastness may not be obtained.

4-2. Second Inkjet Printing Method

The second inkjet printing method of the present invention comprises (1) providing powder by dispersing the resin powder to the surface of an intermediate transfer body, (2) forming an image by ejecting the ink to the surface of the intermediate transfer body to form an ink image on the surface of the intermediate transfer body, and (3) transferring the ink image to the recording medium.

Similarly to the first inkjet printing method, the recording medium that can be used for the second inkjet printing method of the present invention is not specifically limited, and not only a permeable recording medium but also a non-permeable recording medium into which a very low amount of liquid permeates can be used.

In the second inkjet printing method of the present invention, it is preferable that the method comprises forming an image by ejecting an ink to the surface of the intermediate transfer body to form an ink image on the surface of the intermediate transfer body after providing powder by dispersing (spraying) the resin powder on the surface of the intermediate transfer body. The viscosity of the ink increases or the ink coagulates on the resin powder by ejecting the ink and/or the liquid composition onto the resin powder. Since such ink is transferred from the intermediate transfer body to the recording medium, the fixing property of the ink on the recording medium is favorable. In addition, since the solvent in the ink is absorbed by the resin powder, feathering of the ink image transferred on the recording medium can be suppressed.

The timing for ejecting the ink can be at any time after dispersion of the resin powder is finished, preferably within approximately not more than 0.1 seconds after dispersion of the resin powder is finished.

Where a liquid composition is used, it is preferable that the liquid composition and the ink are ejected after the resin powder dispersed (spraied) onto the surface of the intermediate transfer body. After the resin powder is dispersed, either the ink or the liquid composition can be ejected first onto the surface of the intermediate transfer body.

In the second inkjet printing method, the resin powder can be charged, and the intermediate transfer body can be charged to have opposite polarity to that of the resin powder, whereby the resin powder can be dispersed statically on the intermediate transfer body. However, where the resin powder is charged, it is preferable to remove the charge from the resin powder before transferring the resin powder to the recording medium, because where the charged resin powder is transferred on the recording medium, deviation of the ink may occur due to electric fields, which is not preferable. Examples of the system for charging the surface of the intermediate transfer body to have opposite polarity include known methods such as a method comprising charging by applying voltage to an electroconductive rubber roll contacting with an intermediate transfer body, and a method comprising providing a bias electropotential to an electroconductive layer provided on an intermediate transfer body. Any method can be used so long as it is a method that can charge the surface of the intermediate transfer body to have the required electropotential level.

Where the intermediate transfer body is used, it is preferable that the method comprises cleaning, since the ink and the resin powder that are not transferred from the intermediate transfer body to the recording medium may remain on the intermediate transfer body.

The intermediate transfer body used for the second inkjet printing method is not specifically limited, and a conventional intermediate transfer body can be applied. For example, such intermediate transfer body can be in the form of a cylinder or an endless belt. Alternatively, an intermediate transfer body having a construction comprising a substrate and a release layer is preferable. Any substrate can be used so long as it is a substrate that can be transported repetitively and rotatably in the apparatus and having heat resistance that required during transferring and fixing. Specific examples include flexible substrates such as polyimide resin films; polycarbonate resin films; films made of polyester; polyethyleneterephthalate, polyethersulfone, polyetherketone, polysulfone, polyimide, polyimideamide or polyamide; and metal thin films made of nickel or stainless. Examples of the materials used for the release layer include silicone rubbers, silicone resins, silicone copolymers, fluorosilicone resins, fluoro resins (e.g., tetrafluoroethylene-perfluoroalkylvinylether copolymer and polytetrafluoroethylene) and fluoro rubbers.

In the second inkjet printing method, explanations on the methods for ejecting the ink and the liquid composition and for dispersing the resin powder are omitted, because they are similar to those explained for the first inkjet printing method.

The second inkjet printing method can also comprise smoothing an image. Explanation for smoothing an image that can be applied to the second inkjet printing method is omitted, because it is similar to that explained for the first inkjet printing method of the present invention.

In either the first inkjet printing method or the second inkjet printing method, the mass ratio of the resin powder and the aqueous ink is a value obtained by dividing the mass of the aqueous ink by the mass of the resin powder (the mass of the aqueous ink/the mass of the resin powder) of preferably approximately not more than 200, more preferably approximately not more than 100, still more preferably approximately not more than 20. Where the value exceeds approximately 200, the capability of the resin powder to absorb the solvent in the ink become insufficient, whereby improvement on the image quality by preventing inter-color bleeding tends to become insufficient.

In addition, where a liquid composition is applied, the mass ratio of the amount of the ink per one pixel and the amount of the liquid composition per one pixel (i.e. ink:liquid) is preferably approximately 100:5 to 100:100, more preferably approximately 100:5 to 100:50, still more preferably approximately 100:10 to 100:20. Where the amount of the liquid a pixel per the amount of ink composition a pixel is approximately less than 5/100, effect of aggregation decreases. On the other hand, where the amount of the liquid a pixel per the amount of ink composition a pixel exceeds approximately 100/100, curling and cockling of the recording medium may be deteriorated.

5. Image Forming Apparatus

The image forming apparatus having a construction that operates based on the inkjet printing method of the present invention to form an image is not specifically limited. Examples thereof include a conventional inkjet recording apparatus, a recording apparatus comprising a heater for controlling dryness of the ink and a recording apparatus comprising an intermediate transfer mechanism in which a recording material is printed on the intermediate and then transferred to a recording medium such as paper.

Hereinafter preferable embodiments of the image forming apparatus of the present invention are explained in detail with referring to the drawings. In the drawings, same or corresponding portions have the same symbol, and duplicated explanations are omitted.

Figure 2:
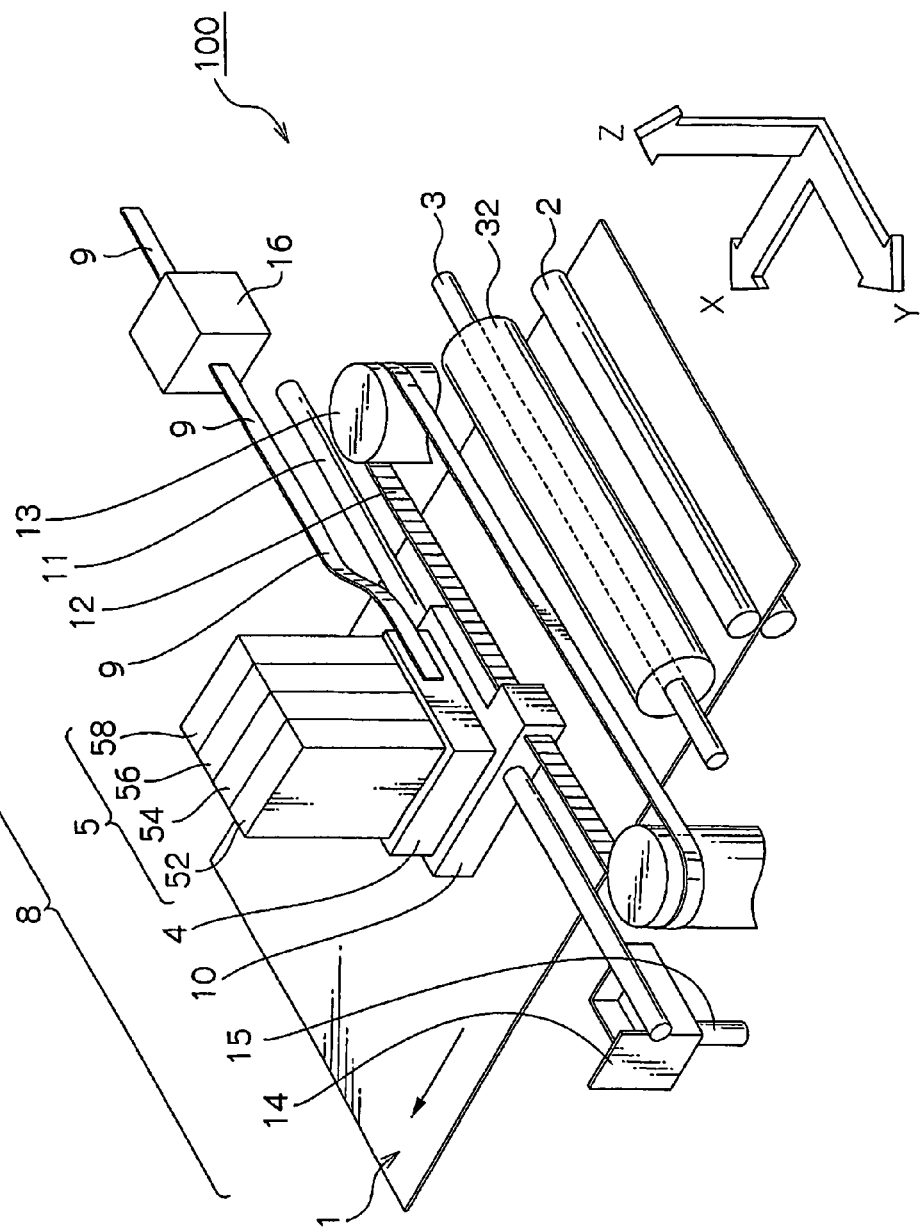
FIG. 2 is a perspective illustration that shows the internal constitution of the image forming apparatus of the present invention shown in FIG. 1.

FIG. 1 is a perspective illustration that shows the outer constitution of a preferable embodiment of the image forming apparatus of the present invention. FIG. 2 is a perspective illustration that shows the internal basic constitution of the image forming apparatus shown in FIG. 1. The image forming apparatus of the present embodiment 100 has a construction that operates based on the above-mentioned inkjet printing method of the present invention to form an image. As shown in, FIGS. 1 and 2, image forming apparatus 100 is mainly constituted by an outer cover 6; a tray 7 on which a predetermined amount of recording medium 1 such as plain paper can be mounted; a transporting rollers (transporting unit) 2 for transporting recording medium 1 to the internal portion of image forming apparatus 100 by one sheet; a powder supplying unit (powder dispersing unit) 3 for dispersing the resin powder to one surface of the recording medium 1 being carried by transporting rollers 2 in the direction of transporting X shown in FIGS. 1 and 2; and an image forming portion (image forming unit) 8 that forms an ink image by ejecting the ink to the surface of recording medium 1 on which the resin powder has been dispersed by powder supplying unit 3.

The carrying rollers 2 are a pair of rollers that are rotatably placed in image forming apparatus 100, the rollers hold tight the recording medium 1 set on tray 7 and transports a predetermined amount of recording medium 1 to the internal portion of apparatus 100 at a predetermined timing by one sheet.

The powder supplying unit 3 is rotatably placed upstream side of image forming portion 8 in the direction of transporting X of recording medium 1, and is constituted by a cylindrical powder holding portion that can hold the predetermined amount of the resin powder in its internal portion and a driving portion (not illustrated) being connected to the both ends of the cylindrical powder holding portion that rotates at predetermined speed in which the central axis of the cylindrical powder holding portion is a rotation axis. Slit 32 is formed on the side surface of the cylindrical powder holding portion that can disperse a predetermined amount of the resin powder held in the internal portion in accordance with the rotation of the cylindrical portion. Thus, powder supplying unit 3 rotates at the predetermined timing and disperses the resin powder to the surface of recording medium 1 being transported.

The image forming unit 8 forms an ink image on the surface of the recording medium 1 on which the resin powder transported from powder supplying unit 3 has been dispersed. Image forming portion 8 is mainly constituted by a recording head 4, an ink set 5, a feeding signal cable 9, a carriage 10, a guide rod 11, a timing belt 12, a driving pulleys 13 and a maintenance station 14.

The ink set 5 comprises ink tanks 52, 54, 56 and 58 in which inks having different colors are contained and the inks can be ejected therefrom. The recording head 4 comprises a nozzle, and feeding signal cable 9 and ink set 5 are connected to the head. Where information for image recording is input to recording head 4 via feeding signal cable 9, recording head 4 sucks predetermined amounts of inks from the ink tanks and ejects the inks to the surface of the recording medium based on the information for image recording. The feeding signal cable 9 also plays a role for providing electric power required for driving recording head 4 with recording head 4 besides the information for image recording.

The recording head 4 is provided on and held by carriage 10, and guide rod 11, and timing belt 12 connected to driving pulleys 13 are connected to carriage 10. According to such construction, recording head 4 can move along guide rod 11 in the direction Y, which is vertical to the direction of transporting X of recording medium 1 and parallel to the direction of the surface of recording medium 1 on which the resin powder have been dispersed. Driving pulleys 13 rotate by the predetermined timing based on the information of image recording, whereby carriage 10 that holds recording head 4 drives along guide rod 11 via timing belt 12 to form an image on the predetermined area on the surface of recording medium 1.

The image forming apparatus 100 also comprises a control units (not illustrated) that adjusts the timing of driving of recording head 4 and that of carriage 10 based on the information for image recording. Accordingly, images based on the information for image recording can be continuously formed on the predetermined area on the surface of recording medium 1 being transported at a predetermined velocity.

The maintenance station 14 is connected to a decompression apparatus (not illustrated) via tube 15. Maintenance station 14 is also connected to the nozzle portion of recording head 4, and has a function for sucking the inks from recording head 4 by decompressiing in the nozzle of recording head 4. By using maintenance station 14, excessive amounts of inks those adhere to the nozzle during operation of image forming apparatus 100 can be removed where necessary, and evaporation of the inks from the nozzle during the operation is stopped can be suppressed.

Preferable embodiments of the present invention are explained above in detail. However, the present invention is not limited to these embodiments. For example, for the above-mentioned embodiment of image forming apparatus 100, the case where powder supplying unit (powder dispersing unit) 3 is constituted by a cylindrical powder holding portion having a slit 32 and a driving portion that rotates the cylindrical portion is explained, but the shape of the powder holding portion in the powder supplying unit (powder dispersing unit) 3 and manner of dispersion of the resin powder are not specifically limited for the image forming apparatus of the present invention. For example, as shown in powder supplying unit 3a in FIGS. 3A and 3B, the powder supplying unit can be a rectangular powder holding portion in which the lower surface 34 faced to the surface of recording medium 1 has a mesh structure for dispersing the resin powder. In this case, the resin powder can be dispersed by vibrating the powder holding portion, or can be dispersed, as shown in FIG. 4, by using charging units 36 for forming static field between powder supplying unit 3a and recording medium 1. Where the powder is dispersed by vibrating the powder holding portion, the apparatus can be of a constitution as shown in FIG. 5, wherein soft body 37, which is a rotatable roll made of foamed urethane, is provided between the powder holding portion in which powder supplying unit 3a is vibrated and the surface of recording medium 1 so that the state of dispersion of the resin powder to be dispersed on the surface of recording medium 1 can be improved.

Figure 7A:
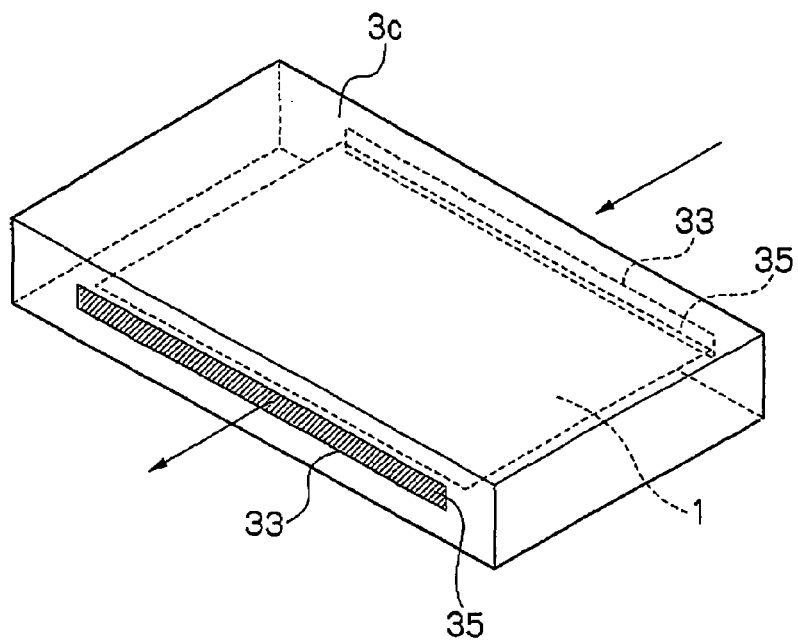
FIG. 7A is a perspective illustration that shows the still another embodiment of the powder supplying unit FIGS. 6A and 6B.
Figure 7B:
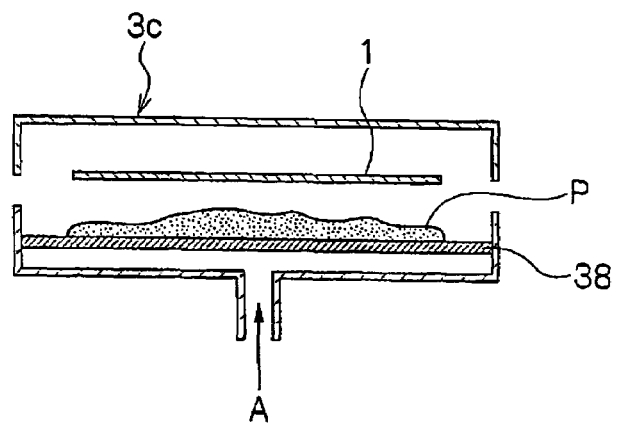
FIG. 7B is a sectional illustration of the powder supplying unit shown in FIG. 7A.

Alternatively, the powder supplying unit (powder dispersing unit) 3 can be a constitution as shown by powder supplying unit 3b in FIGS. 6A and 6B, in which an openings 33 for supplying and ejecting recording medium 1 are provided on the opposing surfaces of the rectangular powder holding portion, respectively, so that resin powder P can be dispersed to the surface of the recording medium 1 upon passing the powder holding portion. In this case, a construction shown by powder supplying unit 3c shown in FIGS. 7A and 7B can be used. In this construction, the powder holding portion has a size that allows containing recording medium 1 by one sheet, and comprises openings 33 each having a shutter 35 and an air-permeable plate 38 made of porous material that holds resin powder P is provided in the internal portion of the powder holding portion, in which the resin powder is floated in the internal portion of the powder holding portion by blowing air A from the back surface of the air-permeable plate.

In addition, for image forming apparatus 100 of the above-mentioned embodiment, a constitution wherein powder supplying unit (powder dispersing unit) 3 is provided upstream side of image forming portion (image forming unit) 8 in the direction of transporting X of recording medium 1. In the above-mentioned embodiment, image forming unit 8 forms images on the surface of recording medium 1 on which the resin powder has been dispersed by powder supplying unit 3. However, the image forming apparatus of the present invention is not limited to the above-mentioned embodiment. For example, the apparatus can be of a constitution comprising a powder supplying unit which disperses the resin powder to the surface of the recording medium on which an ink image has been formed by the image forming unit, and a control unit which controls the period from the starting or finishing of ejection of the ink by the image forming unit to the starting of the dispersion of the resin powder by a powder supplying unit, based on the condition of dropping of the ink on the recording medium and permeability of the ink into the recording medium. In this case, the condition of dropping of the ink on the recording medium can be determined based on the space between the printer head and the recording medium, spraying velocity of the ink drops and transporting velocity of the recording medium, and the permeability of the ink into the recording medium can be determined based on the composition of the ink, the amount of the ink per unit area of the recording medium and the kind of the recording medium.

Figure 8:
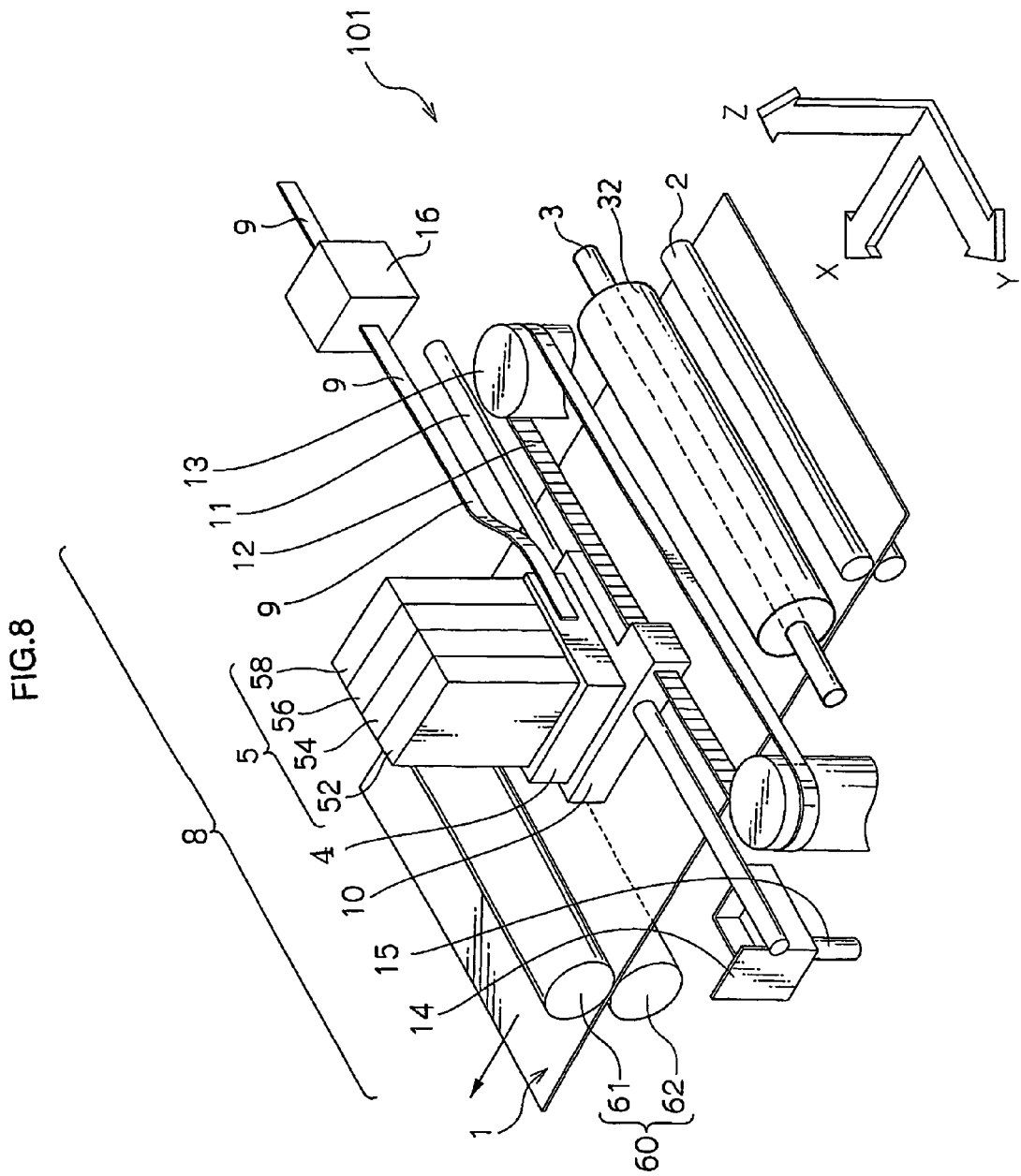
FIG. 8 is a perspective illustration that shows the internal construction of the other image forming apparatus of the present invention.

FIG. 8 is a perspective illustration of the basic construction of the internal portion of a preferable embodiment of the image forming apparatus of the present invention.

Since the image forming apparatus of the present embodiment 101 is similar to image forming apparatus 100 shown by FIGS. 1 and 2 except that an image smoothing units 60 is provided, explanations on the elements other than image smoothing units 60 are omitted herein. The image smoothing units 60 in image forming apparatus 101 is constituted by a pair of pressurizing rollers 61 and 62. The pressurizing rollers 61 and 62 can be rollers in which a release layer made of a silicone resin or a fluoro resin has been provided on the surface of a metal roll made of aluminum or stainless steel.

For image smoothing units 60 for image forming apparatus 101 shown in FIG. 8, a construction comprising a pair of pressurizing rollers 61 and 62 is explained, but image smoothing units 60 is not specifically limited and can be of a known shape such as pressurizing plates in the form of planar plates. The shape of the pressurizing roller is also not limited, and can be cylindrical having a predetermined inner diameter or columnar.

In image forming apparatus 101, it is preferable that image smoothing units 60 is located downstream side of the powder supplying unit (powder dispersing unit) 3 and image forming portion (image forming unit) 8.

Figure 9:
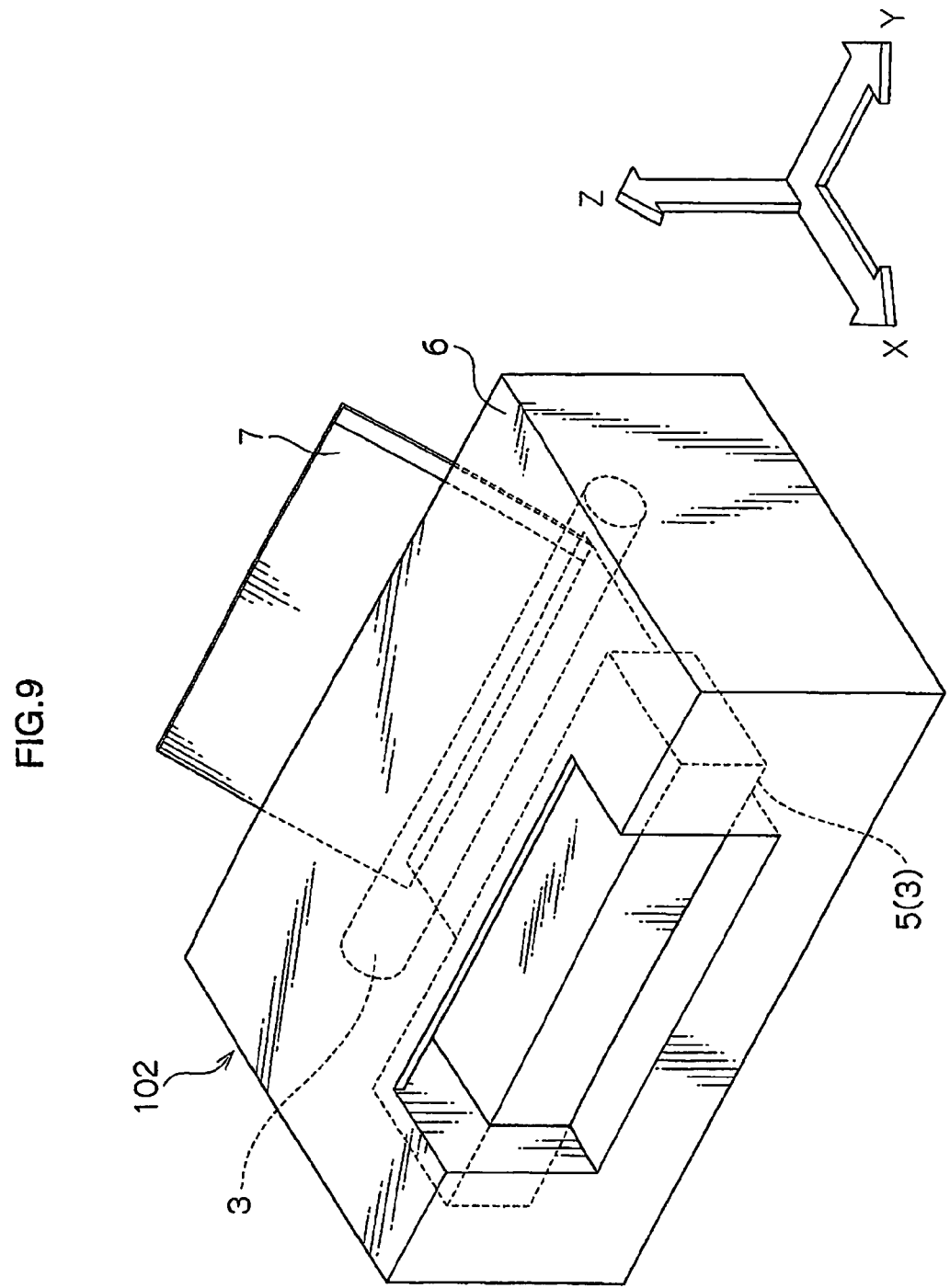
FIG. 9 is a perspective illustration that shows the outer construction of the other image forming apparatus of the present invention.
Figure 10:
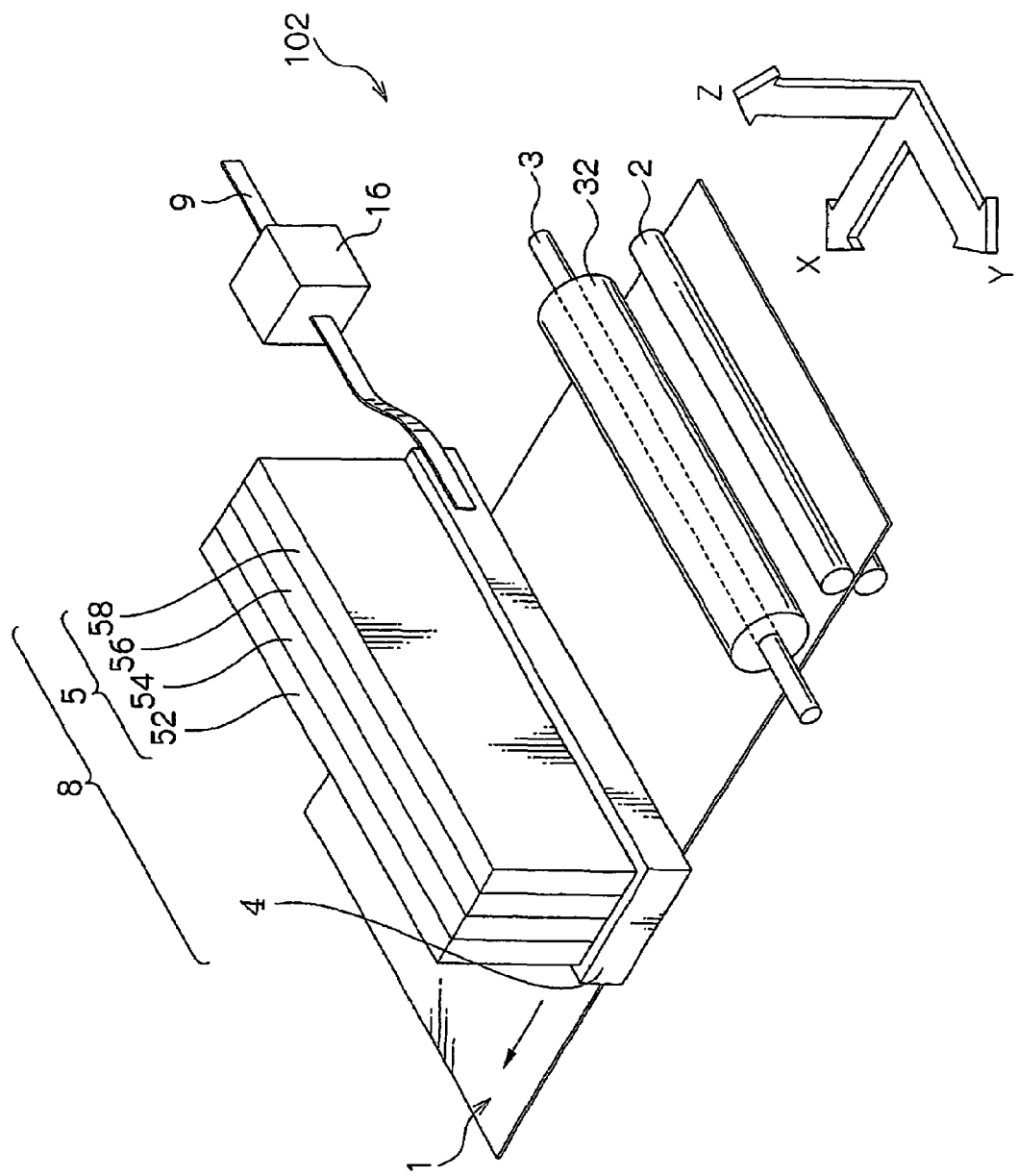
FIG. 10 is a perspective illustration that shows the internal construction of the image forming apparatus of FIG. 9.

FIG. 9 is a perspective illustration that shows the outer construction of the other preferable embodiment of the inkjet recording forming apparatus of the present invention. FIG. 10 is a perspective illustration that shows the basic construction of the inkjet recording apparatus (hereinafter referred to as an image forming apparatus) of FIG. 9. The image forming apparatus of the present embodiment 102 has a construction that operates based on the above-mentioned inkjet printing method of the present invention to form an image.

In image forming apparatus 102 shown in FIGS. 9 and 10, the width of recording head 4 is not less than the width of recording medium 1, and the image forming apparatus is constituted by a paper feeding facility that feeds paper in the subscanning direction (direction for transporting recording medium 1: direction of arrow X), and does not comprise carriage facility. In the present embodiment, the facility refers to transporting rollers 2, but a paper feeding facility can be also used belt types. Recording head 4 also comprises a group of nozzles sequentially aligned that eject colors (comprising a treating liquid) in the subscanning direction (the nozzles is not illustrated), similarly to that ink tanks 52,54,56 and 58 are aligned in the subscanning direction (direction for transporting recording medium 1: arrow X). Explanations on other elements of this construction are omitted since these elements are similar to those of image forming apparatus 100 shown in FIGS. 1 and 2.

In image forming apparatus 102 shown in FIGS. 9 and 10, it tends to be difficult to balance drying property or fixing property of the ink and feathering or concentration of the image, because printing velocity is quite high. However, in the inkjet printing method of the embodiments using the resin powder, all of these properties can be improved. Accordingly, the inkjet printing method of the embodiments is suitable for the embodiment of image forming apparatus 102 wherein printing velocity is high.

Figure 11:
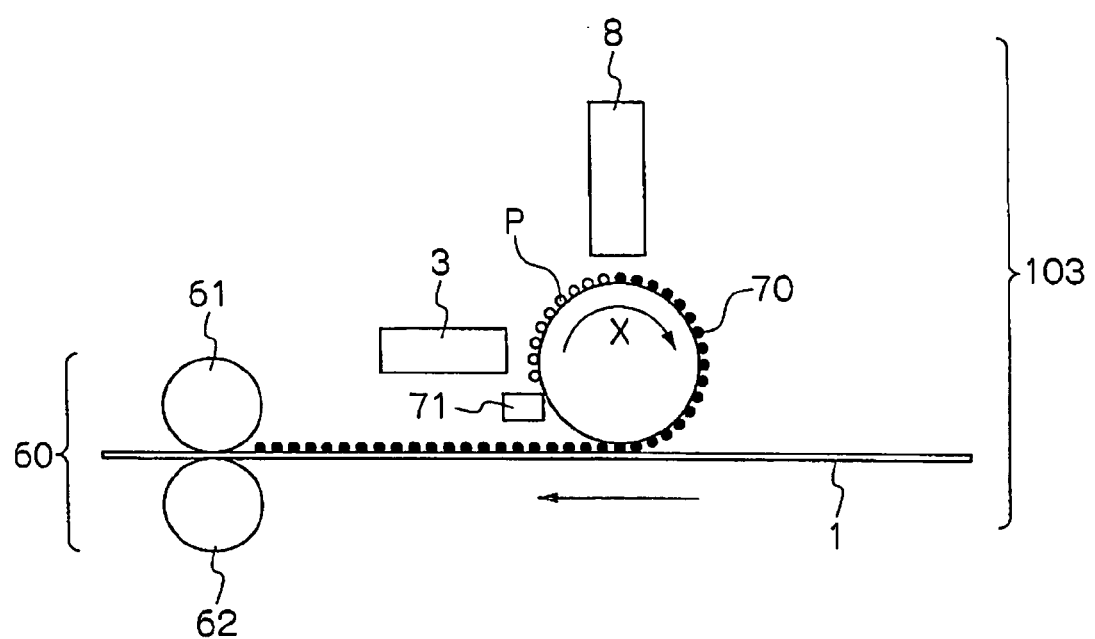
FIG. 11 is an illustration that shows other embodiment of the present invention.

FIG. 11 is a schematic illustration of image forming apparatus 103 using an intermediate transfer body.

Image forming apparatus 103 mainly comprises an image forming portion (image forming unit) 8, a powder supplying unit (powder dispersing unit) 3, an intermediate transfer body 70, a cleaning apparatus 71, and a pair of pressurizing rollers 61 and 62 (image smoothing unit 60). Futhermore, image forming apparatus 103 can comprise a image transferring portion (image transferring unit). In FIG. 11, the image transferring portion is a portion wherein intermediate transfer body 70 touches recording medium 1.

Powder supplying unit 3 is provided at the upstream side of the image forming unit 8 in the direction of rotation X of the intermediate transfer body. Explanation on powder supplying unit 3 is omitted since it is similar to that of image forming apparatus 100 explained in FIGS. 1 and 2.

Image forming unit 8 forms an image on the surface of the recording medium 1 on which the resin powder transported from powder supplying unit 3 has been dispersed. Explanation on the construction of image forming unit 8 is omitted since it is similar to that explained for image forming apparatus 100 shown in FIGS. 1 and 2.

Intermediate transfer body 70 and recording medium 1 are placed to contact each other, and the ink image formed on the surface of intermediate transfer body 70 is transferred to recording medium 1. The ink and resin powder remaining on the surface of intermediate transfer body 70 without being transferred to recording medium 1 are removed from intermediate transfer body 70 by cleaning apparatus 71.

The above-mentioned image forming apparatuses each has a construction that operates based on the inkjet printing method of the present invention. Therefore, drying property can be improved, feathering can be prevented effectively, and fixing property of the ink can be improved, whereby fastness of the image can be improved. Accordingly, a printed image having excellent image quality can be obtained using the image forming apparatus of the embodiments.

EXAMPLES

Hereinafter the inkjet printing method of the present invention and the image forming apparatus using the same are explained in more detail with referring to Examples and Comparative Examples. However, the present invention should not be construed to be limited by these Examples.

[Preparation of Ink A]

A mixture comprising the following composition is prepared: Cabojet300 (trade name, manufactured by Cabot Corporation) as a pigment (5 parts per weight), diethylene glycol as a water-soluble organic solvent (10 parts per weight), Olfin E1010 (trade name, manufactured by Nisshin Chemical Industry Co., Ltd.) as a surfactant (1 parts per weight) and ion exchanged water (balance).

The mixture is subjected to centrifugation (8000 rpm×30 min) using a centrifuge apparatus, and residual portion (20 vol % relative to whole volume) is removed to give a pigment dispersion liquid.

A predetermined amount of the pigment dispersion liquid is taken, and a solvent and other additives are added to the liquid by predetermined amounts. These components are mixed by stirring and the mixture is passed through a filter (1 μm) to prepare ink A having total weight of 100 parts per weight wherein the concentration of the colorant has been adjusted to a predetermined concentration.

Ink A has a viscosity of 3.2 mPa·s and a surface tension of 31 mN/m.

[Preparation of Resin Powder A]

Styrene/sodium acrylate/butyl methacrylate/glycidyl methacrylate are prepared by the mol ratio of 60/20/20/1. To the mixture is added a polymerization initiator (1 mass %), and polymerization is carried out at 80° C. to give a cross-linked substance. Resin powder A can be obtained by pulverizing the cross-linked substance by a pulverizing method.

Resin powder A has a weight average molecular weight of 15,000 and an average particle size of 6 μm.

Where resin powder A is dissolved in toluene, a portion that does not dissolve in toluene exists. In this Examples, a powder comprising a portion that does not dissolve in toluene is hereinafter referred to as a powder having partially cross-linked structure. In the Examples, the molecular weight of the resin powder is measured by GPC after the portion being insoluble in toluene is removed.

[Preparation of Resin Powder B]

Resin powder B is prepared according to a similar method to the preparation of resin powder A except that condition of polymerization is changed. Resin powder B has a weight average molecular weight of 8,000 and an average particle size of 5 μm.

[Preparation of Resin Powder C]

Styrene/acrylic acid/butyl methacrylate/glycidyl methacrylate are prepared by the mol ratio of 60/20/20/1. 1% of a polymerization initiator is added to the mixture and polymerization is carried out at 80° C. to give a cross-linked substance. The cross-linked substance is pulverized by pulverizing method and treated with 1N-NaOH solution so that the mol ratio of NaOH per acrylic acid becomes 50%. And then resin powder C is obtained in which the composition ratio of the acrylic is 10% and carboxyl groups having the form of sodium salt is 10% per whole resin powder. Resin powder C has a weight average molecular weight of 10,000 and an average particle size of 5 μm.

[Preparation of Resin Powder D]

Resin powder D is prepared according to a similar manner to that of the preparation of resin powder C, except that the mol ratio of NaOH relative to the acrylic acid is adjusted to 100%, so that the composition ratio of the acrylic acid comprising a carboxyl group in the form of sodium salt can be adjusted to 20% relative to whole acrylic acid by treating the resin with the 1N-NaOH solution to convert all carboxyl groups of the acrylic acid. Resin powder D has a weight average molecular weight of 10,000 and an average particle size of 6 μm.

[Preparation of Resin Powder E]

Resin powder E is prepared according to a similar manner to that of the preparation of resin powder C, except that the condition for pulverization is changed. Resin powder E has a weight average molecular weight of 10,000 and an average particle size of 0.1 μm.

[Preparation of Resin Powder F]

A cationic cross-linked substance can be obtained by preparing dimethylaminoethylmethacrylate/styrene/sodium methacrylate/butyl methacrylate/hydroxyethyl acrylate by the mol ratio of 3/47/20/20/10 and polymerizing the monomers. This cross-linked substance is pulverized by pulverizing method to give resin powder F. Resin powder F is a partially cross-linked substance having a weight average molecular weight of 16,000 and an average particle size of 6 μm.

[Preparation of Resin Powder G]

Resin powder G is prepared according to a similar manner to that of the preparation of resin powder F, except that the condition for polymerization is changed. Resin powder G is a partially cross-linked substance having the weight average molecular weight of 300,000 and the average particle size of 10 μm.

[Preparation of Resin Powder H]

Dimethylaminomethacrylate onium salt (C1)/styrene/methyl methacrylate/n-butyl methacrylate are prepared by the mol ratio of 10/40/25/25 in an apparatus and polymerized to give a cross-linked substance. Resin powder H can be obtained by pulverizing this cross-linked substance by pulverizing method. Resin powder H is a partially cross-linked substance having a weight average molecular weight of 20,000 and an average particle size of 8 μm.

[Preparation of Resin I]

Resin I is prepared according to a similar manner to that of the preparation of resin powder A, except that the amount of glycidyl methacrylate is increased by 5 mol. The obtained resin I does not dissolve in toluene at all and is a wholly cross-linked substance. Therefore, molecular weight cannot be measured.

[Preparation of Resin Powder J]

Resin powder J is prepared according to a similar manner to that of the preparation of resin powder A, except that the condition of polymerization is changed. Resin powder J has a weight average molecular weight of 6,000 and an average particle size of 5 μm.

[Preparation of Resin Powder K]

Resin powder K in which all of the polar groups do not have salt form is prepared according to a similar manner to that of the preparation of resin powder C, except that treatment with NaOH is not carried out. Resin powder K has a weight average molecular weight of 10,000 and an average particle size of 6 μm.

[Preparation of Resin Powder L]

Resin powder L is prepared according to a similar manner to that of the preparation of resin powder F, except that the condition of pulverizing is changed, and then 50% of the acid is neutralized using 1N-NaOH. Resin powder L is a partially cross-linked substance having a weight average molecular weight of 16,000 and an average particle size of 15 μm.

Example 1

Printing is carried out using the recording media shown in Table 2.

Where recording medium is C2 (plain paper, manufactured by Fuji Xerox Co., Ltd.), an image forming apparatus having a similar construction to that of image forming apparatus 101 shown in FIG. 8 except that a powder supplying unit similar to powder supplying unit 3a shown in FIGS. 3(a) and 3(b) having a construction that disperses the resin powder by opening the mesh portion only where the recording medium passes, is used.

Where recording medium is OK Kinfuji N (trade name, art paper, manufactured by Oji paper Ltd.) or a PET film (PET film for OHP, manufactured by Ricoh Company Ltd.), an image forming apparatus having a similar construction to that of image forming apparatus 101 shown in FIG. 8 except that powder supplying unit 3 is located downstream side of inkjet head 4 but upstream side of pressurizing rollers 61 and 62 relative to the direction of transporting of the recording medium is used.

A powder mixture of 99.5 mass % of resin powder A and 0.5 mass % of hydrophobic silica (trade name: Aerosil R972, manufactured by Nippon Aerosil Co., Ltd.) is set in powder supplying unit 3a, and ink A is set in ink set 5. A 100% coverage pattern is printed (solid printed) using the ink by a piezo system inkjet head at the resolution of 720×360 dpi. The amount of dispersion of the powder mixture is adjusted to 1.5 g/m$^2$.

Printing using this inkjet ink and evaluation thereof is carried out under the condition of the temperature of 23±0.5° C. and the humidity of 55±5% R.H.

Examples 2 to 8 and Comparative Examples 1 to 4

Printing is carried out according to a similar manner to Example 1, except that ink A and the powder mixture shown in Table 1 are set in the image forming apparatus as used in Example 1.

TABLE 1

|  | Mixed powder | Mixing ratio (mass %) |
|---|---|---|
| Example 1 | Powder A | 99.5 |
|  | Hydrophobic silica | 0.5 |
| Example 2 | Powder B | 99.5 |
|  | Hydrophobic silica | 0.5 |
| Example 3 | Powder C | 99.5 |
|  | Hydrophobic silica | 0.5 |
| Example 4 | Powder D | 50 |
|  | Powder A | 49.5 |
|  | Hydrophobic silica | 0.5 |
| Example 5 | Powder E | 99.5 |
|  | Hydrophobic silica | 0.5 |
| Example 6 | Powder F | 99.5 |
|  | Hydrophobic silica | 0.5 |
| Example 7 | Powder G | 99.5 |
|  | Hydrophobic silica | 0.5 |
| Example 8 | Powder H | 99.5 |
|  | Hydrophobic silica | 0.5 |
| Comparative Example 1 | Powder I | 99.5 |
|  | Hydrophobic silica | 0.5 |
| Comparative Example 2 | Powder J | 99.5 |
|  | Hydrophobic silica | 0.5 |
| Comparative Example 3 | Powder K | 99.5 |
|  | Hydrophobic silica | 0.5 |
| Comparative Example 4 | Powder L | 99.5 |
|  | Hydrophobic silica | 0.5 |

[Evaluation of Inkjet Printing Method]

The images printed on paper shown in Table 2 under the conditions of Examples 1 to 8 and Comparative Examples 1 to 4 are evaluated for water-absorbing property, fixing property and concentration unevenness of solid-printed portion according to the following evaluation method and evaluation criteria. Furthermore, transparency of the solid-printed portion is evaluated using the images printed on PET films.

<Water-Absorbing Property>

One minutes after printing, plain paper is superposed on the image portion and pressure of 50 g/cm$^2$ is applied. Water-absorbing property is determined by the following criteria according to the state of transfer. ○ and Δ are acceptable level of water-absorbing property. The results are shown in Table 2.
○: No transferring is observed.
Δ: Some transferring is observed.
×: Transferring is observed.

<Fixing Property>

One minute after printing, the image portion is scrubbed with a finger, and fouling on the finger is evaluated according to the following evaluation criteria to determine the fixing property. ○ and Δ are acceptable level of fixing property. The results are shown in Table 2.
○: No fouling is observed.
Δ: Some fouling is observed.
×: Fouling is observed.

<Concentration Unevenness of Solid-Printed Portion>

Unevenness of the printed portion is evaluated as follows. ○ and Δ are acceptable level of unevenness. The results are shown in Table 2.
○: No unevenness is observed.
Δ: Some unevenness is observed.
×: Unevenness is observed.

<Transparency of Solid-Printed Portion>

Transparency of the printed portion is evaluated as follows. ○ and Δ are acceptable level of transparency. The results are shown in Table 2.
○: No turbidity is observed.
Δ: Some turbidity is observed.
×: Turbidity is observed.

TABLE 2

|  | Paper | Water-absorbing property | Fixing property | Concentration unevenness | Transparency |
|---|---|---|---|---|---|
| Example 1 | C2 | ○ | ○ | ○ | — |
|  | OK Kinfuji N | ○ | ○ | ○ | — |
|  | PET film | ○ | ○ | ○ | ○ |

TABLE 2-continued

|  | Paper | Water-absorbing property | Fixing property | Concentration unevenness | Transparency |
|---|---|---|---|---|---|
| Example 2 | C2 | ○ | ○ | ○ | — |
|  | OK Kinfuji N | ○ | ○ | ○ | — |
|  | PET film | ○ | ○ | ○ | ○ |
| Example 3 | C2 | ○ | ○ | ○ | — |
|  | OK Kinfuji N | ○ | ○ | ○ | — |
|  | PET film | ○ | ○ | ○ | ○ |
| Example 4 | C2 | ○ | ○ | ○ | — |
|  | OK Kinfuji N | ○ | ○ | ○ | — |
|  | PET film | ○ | ○ | ○ | ○ |
| Example 5 | C2 | ○ | ○ | ○ | — |
|  | OK Kinfuji N | ○ | ○ | ○ | — |
|  | PET film | ○ | ○ | ○ | ○ |
| Example 6 | C2 | ○ | ○ | ○ | — |
|  | OK Kinfuji N | ○ | ○ | ○ | — |
|  | PET film | ○ | ○ | ○ | ○ |
| Example 7 | C2 | ○ | ○ | ○ | — |
|  | OK Kinfuji N | ○ | ○ | ○ | — |
|  | PET film | ○ | ○ | ○ | ○ |
| Example 8 | C2 | ○ | ○ | ○ | — |
|  | OK Kinfuji N | ○ | ○ | ○ | — |
|  | PET film | ○ | ○ | ○ | ○ |
| Comparative Example 1 | C2 | ○ | Δ | Δ | — |
|  | OK Kinfuji N | X | X | X | — |
|  | PET film | X | X | X | X |
| Comparative Example 2 | C2 | Δ | X | X | — |
|  | OK Kinfuji N | X | X | X | — |
|  | PET film | X | X | X | X |
| Comparative Example 3 | C2 | ○ | X | Δ | — |
|  | OK Kinfuji N | X | X | X | — |
|  | PET film | X | X | X | X |
| Comparative Example 4 | C2 | ○ | Δ | Δ | — |
|  | OK Kinfuji N | X | X | X | — |
|  | PET film | X | X | X | X |

In the inkjet printing method and the image forming apparatus using the resin powder used for the present invention, all of absorbing property, fixing property, concentration unevenness and transparency are favorable.

Where the evaluation is carried out using the image forming apparatus shown in FIG. 8 that provides the ink and the resin powder on the recording medium, all of absorbing property, fixing property, concentration unevenness and transparency are evaluated to be favorable in Examples 1 to 8. These properties are also evaluated to be favorable where the image forming apparatus comprising the intermediate transfer body as shown in FIG. 11 is used instead of the apparatus of FIG. 8. In Examples 1 to 8, printing is carried out by setting ink A in ink set 5.

In addition, printing is carried out by setting ink A and the liquid composition mentioned below in ink set 5, dispersing the resin powder on the recording medium, ejecting the liquid composition and then ejecting the ink.

| (Liquid composition) | |
|---|---|
| Diethylene glycol | 30 mass % |
| Magnesium nitrate hexahydrate | 7.5 mass % |
| Acetylene glycol ethyleneoxide adduct | 1 mass % |
| Ion exchanged water | Balance |

The liquid composition has a pH of 5.6, a surface tension of 33 mN/m and a viscosity of 2.9 mPa·s.

Where the latter method is used for Example 1 to 8, all of absorbing property, fixing property, concentration unevenness and transparency are also favorable.

What is claimed is:

1. An inkjet printing method comprising:
   forming an image by ejecting an ink comprising at least a colorant and a solvent to a surface of a recording body, and
   dispersing a resin powder to the surface of the recording body,
   wherein the resin powder has a particle size of approximately not less than 0.1 µm to not more than 10 µm and a weight average molecular weight of approximately not less than 8,000 to not more than 300,000 and comprises a monomer comprising a polar group having a salt structure.

2. An inkjet printing method according to claim 1, wherein the composition ratio of the monomer comprising a polar group having a salt structure is approximately not less than 10 mol % to not more than 95 mol % of the total amount of polar groups.

3. An inkjet printing method according to claim 1, wherein the resin powder has a partially cross-linked structure.

4. An inkjet printing method according to claim 1, wherein the resin powder is an ionomer having an ion-associated phase.

5. An inkjet printing method according to claim 1, wherein microparticles having a particle size smaller than that of the resin powder are used in combination with the resin powder.

6. An inkjet printing method according to claim 1, wherein the colorant is a pigment.

7. An inkjet printing method according to claim 1, wherein the resin powder and the colorant have different polarities.

8. An inkjet printing method according to claim 1, wherein the recording body is a recording medium.

9. An inkjet printing method according to claim 1, wherein:
the recording body is an intermediate transfer body; and
the method further comprises transferring an ink image formed on a surface of the intermediate transfer body onto a surface of a recording medium.

10. An inkjet printing method according to claim 8, wherein:
the recording medium is a permeable recording medium; and
the method further comprises providing a powder by dispersing the resin powder to the surface of the permeable recording medium, followed by forming an image by ejecting an ink to the surface of the permeable recording medium, so that an ink image is formed on the surface of the permeable recording medium on which the resin powder has been dispersed.

11. An inkjet printing method according to claim 8, wherein:
the recording medium is a non-permeable recording medium; and
the method comprises forming an image by ejecting an ink to the surface of the non-permeable recording medium, followed by providing a powder by dispersing the resin powder on the surface of the non-permeable recording medium, so that the resin powder is dispersed on the surface of the non-permeable recording medium on which the ink has been ejected.

12. An inkjet printing method according to claim 9, further comprising:
providing a powder by dispersing the resin powder on the surface of the intermediate body, followed by forming an image by ejecting an ink to the surface of the intermediate body, so that an ink image is formed on the surface of the intermediate body on which the resin powder has been dispersed; and
transferring the ink image onto a recording medium.

13. An inkjet printing method according to claim 10, further comprising smoothing a surface of the image formed on the surface of the recording medium after providing the powder and forming the image.

14. The inkjet printing method according to claim 12, further comprising smoothing a surface of the image formed on the surface of the recording medium after providing the powder and forming the image.

15. An image forming apparatus comprising:
a image forming unit which ejects an ink comprising a colorant and a solvent to a surface of a recording body to form an ink image on the body; and
a powder supplying unit which disperses a resin powder to the surface of the recording body,
wherein the resin powder has a particle size of approximately not less than 0.1 μm to not more than 10 μm and a weight average molecular weight of approximately not less than 8,000 to not more than 300,000 and comprises a monomer comprising a polar group having a salt structure.

16. An image forming apparatus according to claim 15, wherein the composition ratio of the monomer comprising a polar group having a salt structure is approximately not less than 10 mol % to not more than 95 mol % of the total amount of polar groups.

17. An image forming apparatus according to claim 15, wherein:
the recording body is a permeable recording medium,
the powder supplying unit is provided on the image forming unit upstream in the direction of transport of the permeable recording medium; and
the image forming unit forms an ink image on the surface of the permeable recording medium on which the resin powder has been dispersed by the powder supplying unit.

18. An image forming apparatus according to claim 15, wherein:
the recording body is a non-permeable recording medium,
the powder supplying unit is provided on the image forming unit downstream in the direction of transport of the non-permeable medium; and
the powder supplying unit disperses the resin powder on the surface of the non-permeable recording medium on which the ink has been ejected by the image forming unit.

19. A image forming apparatus according to claim 15, further comprising an image transferring unit which transfers a ink image onto a recording medium, wherein:
the recording body is an intermediate transfer body,
the powder supplying unit is provided on the image forming unit upstream in the direction of revolution of the intermediate transfer body; and
the image forming unit forms an ink image on the surface of the intermediate transfer body on which the resin powder has been dispersed by the powder supplying unit, and the ink image is transferred onto the recording medium by the image transferring unit.

20. An image forming apparatus according to claim 17, further comprising an image smoothing unit which smooths the image formed on the surface of the recording medium.

* * * * *